United States Patent
Wang et al.

(10) Patent No.: US 11,223,972 B2
(45) Date of Patent: Jan. 11, 2022

(54) METHOD AND APPARATUS FOR DETERMINING TRANSPORT BLOCK SIZE

(71) Applicant: HUAWEI TECHNOLOGIES CO., LTD., Guangdong (CN)

(72) Inventors: Ting Wang, Shanghai (CN); Hao Tang, Shanghai (CN); Zhenfei Tang, Ottawa (CA); Javad Abdoli, Ottawa (CA); Yi Wang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 22 days.

(21) Appl. No.: 16/719,614

(22) Filed: Dec. 18, 2019

(65) Prior Publication Data

US 2020/0128438 A1    Apr. 23, 2020

Related U.S. Application Data

(63) Continuation of application No. PCT/CN2018/112781, filed on Oct. 30, 2018.

(30) Foreign Application Priority Data

Nov. 17, 2017    (CN) .......................... 201711149094.9

(51) Int. Cl.
*H04W 28/06* (2009.01)
*H04L 5/00* (2006.01)
(Continued)

(52) U.S. Cl.
CPC ............ *H04W 28/06* (2013.01); *H04L 5/0007* (2013.01); *H04L 5/0044* (2013.01);
(Continued)

(58) Field of Classification Search
CPC ....... H04L 1/00; H04L 5/0044; H04L 5/0048; H04L 5/0007; H04L 5/0053;
(Continued)

(56) References Cited

U.S. PATENT DOCUMENTS

| 2012/0311397 A1 | 12/2012 | Kim et al. |
| 2015/0117396 A1 | 4/2015 | Wang et al. |

(Continued)

FOREIGN PATENT DOCUMENTS

| CN | 102148640 A | 8/2011 |
| CN | 102196495 A | 9/2011 |

(Continued)

OTHER PUBLICATIONS

Huawei, HiSilicon:"TBS determination for short TTI", 3GPP TSG RAN WGI Meeting #90bis, R1-1717143, Prague, Czech Republic, Oct. 9-13, 2017. total 5 pages. XP51340333.

(Continued)

*Primary Examiner* — Maharishi V Khirodhar
*Assistant Examiner* — Kenneth P Hunt
(74) *Attorney, Agent, or Firm* — Womble Bond Dickinson (US) LLP

(57) ABSTRACT

Embodiments of this application provide a method and apparatus for determining a transport block size. The method includes: obtaining a target overhead value based on a target time-frequency resource and one or more of at least two overhead values, where the target time-frequency resource is used for uplink data transmission or downlink data transmission and includes one or more time-frequency resource units, and each overhead value is corresponding to at least one time-frequency resource unit; and determining a transport block size based on the target overhead value. It can be learned that, according to the method and apparatus for determining a transport block size provided in the embodiments of this application, a corresponding target overhead value may be determined for each of different target time-frequency resources. This is not only applicable to a scenario in which a dynamic time-frequency resource is scheduled, but also improves accuracy of determining the transport (Continued)

block size. Therefore, transmission performance is improved.

20 Claims, 8 Drawing Sheets

(51) Int. Cl.
*H04W 72/04* (2009.01)
*H04W 72/12* (2009.01)

(52) U.S. Cl.
CPC .......... *H04L 5/0053* (2013.01); *H04L 5/0094* (2013.01); *H04W 72/042* (2013.01); *H04W 72/0446* (2013.01); *H04W 72/1205* (2013.01)

(58) Field of Classification Search
CPC ............ H04L 5/0094; H04W 72/1205; H04W 28/06; H04W 72/0446; H04W 72/042; H04W 72/12
See application file for complete search history.

(56) References Cited

U.S. PATENT DOCUMENTS

| | | | | |
|---|---|---|---|---|
| 2018/0324767 | A1* | 11/2018 | Manolakos | H04W 72/0413 |
| 2019/0068313 | A1* | 2/2019 | Lyu | H04L 5/003 |
| 2019/0089511 | A1* | 3/2019 | Saito | H04W 72/042 |
| 2019/0109676 | A1* | 4/2019 | Zhang | H04L 5/0057 |
| 2019/0327018 | A1* | 10/2019 | Tang | H04L 1/0058 |
| 2020/0128529 | A1* | 4/2020 | Wang | H04L 1/0016 |
| 2021/0105783 | A1* | 4/2021 | Wang | H04L 5/001 |
| 2021/0219288 | A1* | 7/2021 | Xing | H04W 72/042 |

FOREIGN PATENT DOCUMENTS

| | | |
|---|---|---|
| CN | 102196570 A | 9/2011 |
| CN | 102447547 A | 5/2012 |
| CN | 103516473 A | 1/2014 |
| CN | 103547340 A | 1/2014 |
| CN | 105992361 A | 10/2016 |
| WO | 2017076336 A1 | 5/2017 |
| WO | 2017175818 A1 | 10/2017 |

OTHER PUBLICATIONS

3GPP TS 36.211 V14.4.0 (Sep. 2017);3rd Generation Partnership Project;Technical Specification Group Radio Access Network;Evolved Universal Terrestrial Radio Access (E-UTRA);Physical channels and modulation(Release 14);total 198 pages.
3GPP TS 36.212 V14.4.0 (Sep. 2017);3rd Generation Partnership Project;Technical Specification Group Radio Access Network;Evolved Universal Terrestrial Radio Access (E-UTRA);Multiplexing and channel coding(Release 14);total 198 pages.
3GPP TS 36.213 V14.4.0 (Sep. 2017);3rd Generation Partnership Project;Technical Specification Group Radio Access Network;Evolved Universal Terrestrial Radio Access (E-UTRA);Physical layer procedures(Release 14);total 461 pages.
Huawei et al.,"Summary of remaining issues on CSI-RS",3GPP TSG RAN WG1 Meeting #90bis R1-1718841,Prague, Czech Republic, Oct. 9-13, 2017,total 6 pages.
Huawei et al.,"Summary of offline discussions on CSI-RS",3GPP TSG RAN WG1 Meeting #90bis R1-1718947,Prague, Czech Republic, Oct. 9-13, 2017,total 5 pages.
Ericsson,"Summary of offline discussion on 7.3.3.1 (TB size, update of R1-1719035)",TSG-RAN WG1 #90bis R1-1719144,Prague, Czech Republic, Oct. 9 13, 2017,total 1 page.

\* cited by examiner

METHOD AND APPARATUS FOR DETERMINING TRANSPORT BLOCK SIZE

CROSS-REFERENCE TO RELATED APPLICATIONS

This application is a continuation of International Application No. PCT/CN2018/112781, filed on Oct. 30, 2018, which claims priority to Chinese Patent Application No. 201711149094.9, filed on Nov. 17, 2017. The disclosures of the aforementioned applications are hereby incorporated by reference in their entireties.

TECHNICAL FIELD

This application relates to the field of communications technologies, and in particular, to a method and apparatus for determining a transport block size.

BACKGROUND

Generally, to effectively complete data transmission, a network device and/or a terminal device need or needs to accurately determine a transport block size (TBS) before data transmission is performed.

With development of communications technologies, there are different quantities of available resource elements (RE) on different time-frequency resources.

Therefore, how to accurately determine a TBS in a communications system is an urgent problem to be resolved.

SUMMARY

Embodiments of this application provide a method and apparatus for determining a transport block size, so that the method and apparatus for determining a transport block size are applicable to a scenario in which a dynamic time-frequency resource is scheduled, and a transport block size can be accurately determined, thereby improving transmission performance.

According to a first aspect, an embodiment of this application provides a method for determining a transport block size, where the method includes:

obtaining a target overhead value based on a target time-frequency resource and one or more of at least two overhead values, where the target time-frequency resource is used for uplink data transmission or downlink data transmission and includes one or more time-frequency resource units, and each overhead value is corresponding to at least one time-frequency resource unit; and determining a transport block size based on the target overhead value.

In the embodiment of the method for determining a transport block size provided in the first aspect, the target overhead value is obtained based on the target time-frequency resource and the one or more of the at least two overhead values, where the target time-frequency resource includes the one or more time-frequency resource units, and each overhead value is corresponding to the at least one time-frequency resource unit; and further, the transport block size is determined based on the target overhead value. It can be learned that, according to the method for determining a transport block size provided in this embodiment of this application, a corresponding target overhead value may be determined for each of different target time-frequency resources. This is not only applicable to a scenario in which a dynamic time-frequency resource is scheduled, but also improves accuracy of determining the TBS. Therefore, transmission performance is improved.

In one embodiment, an overhead value corresponding to a time-frequency resource unit may be a quantity of REs that cannot be used for data transmission on the time-frequency resource unit, or may be a quantity of REs that cannot be used for data transmission other than a quantity of REs of a demodulation reference signal (DMRS). In one embodiment, the overhead value corresponding to the time-frequency resource unit may be determined based on at least one of a quantity of REs used to transmit a control signal, a quantity of REs of a pilot signal, a reserved resource, a rate matching resource, and the like.

In one embodiment, the control signal may include but is not limited to at least one of the following: a control resource set CORESET, an uplink control channel, a downlink control channel, and the like. Certainly, the control signal may further include another signal. This is not limited in the embodiments of this application.

In one embodiment, the pilot signal may include but is not limited to at least one of the following: a channel state information-reference signal (CSI-RS), a synchronization signal block (SS block), a physical broadcast channel (PBCH), a DMRS, a phase tracking reference signal (PTRS), and a synchronization tracking reference signal (TRS). Certainly, the pilot signal may include another signal. This is not limited in this embodiment of this application.

In one embodiment, the overhead value is obtained from one or more pieces of overhead value information indicated by using signaling, and/or the overhead value is obtained from one or more pieces of stored overhead value information.

In one embodiment, the overhead value information includes at least one overhead value, or at least one overhead value identifier.

In one embodiment, the overhead value information further includes information about the at least one time-frequency resource unit corresponding to the overhead value, or the overhead value information further includes information about at least one time-frequency resource unit corresponding to the overhead value identifier.

In one embodiment, the time-frequency resource unit includes at least one of the following: a symbol, a slot, a resource block, a resource block group, and/or a subband.

In one embodiment, the information about the time-frequency resource unit includes at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block identifier, an identifier of the resource block identifier, a resource block group identifier, an identifier of the resource block group identifier, a subband identifier, an identifier of the subband identifier, a resource block quantity, an identifier of the resource block quantity, a resource block group quantity, an identifier of the resource block group quantity, a subband quantity, and/or an identifier of the subband quantity.

In one embodiment, the obtaining a target overhead value based on a target time-frequency resource and one or more of at least two overhead values includes:

obtaining the one or more time-frequency resource units in the target time-frequency resource; and obtaining the target overhead value based on one or more overhead values corresponding to the one or more time-frequency resource units.

In one embodiment, the target overhead value is at least one of a plurality of overhead values; and/or the target overhead value is obtained after a predetermined operation is performed on at least one of a plurality of overhead values.

In one embodiment, the determining a transport block size based on the target overhead value includes:

determining reference resource element information based on the target overhead value, where the reference resource element information is a value of a quantity of reference resource elements that is used to calculate the transport block size; and determining the transport block size based on the reference resource element information, resource block information, a modulation scheme, and a bit rate, where the resource block information is determined based on the target time-frequency resource.

According to a second aspect, an embodiment of this application provides an apparatus for determining a transport block size, where the apparatus includes:

an obtaining module, configured to obtain a target overhead value based on a target time-frequency resource and one or more of at least two overhead values, where the target time-frequency resource is used for uplink data transmission or downlink data transmission and includes one or more time-frequency resource units, and each overhead value is corresponding to at least one time-frequency resource unit; and a determining module, configured to determine a transport block size based on the target overhead value.

In one embodiment, the overhead value is obtained from one or more pieces of overhead value information indicated by using signaling, and/or the overhead value is obtained from one or more pieces of stored overhead value information.

In one embodiment, the overhead value information includes at least one overhead value, or at least one overhead value identifier.

In one embodiment, the overhead value information further includes information about the at least one time-frequency resource unit corresponding to the overhead value, or the overhead value information further includes information about at least one time-frequency resource unit corresponding to the overhead value identifier.

In one embodiment, the time-frequency resource unit includes at least one of the following: a symbol, a slot, a resource block, a resource block group, and/or a subband.

In one embodiment, the information about the time-frequency resource unit includes at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block identifier, an identifier of the resource block identifier, a resource block group identifier, an identifier of the resource block group identifier, a subband identifier, an identifier of the subband identifier, a resource block quantity, an identifier of the resource block quantity, a resource block group quantity, an identifier of the resource block group quantity, a subband quantity, and/or an identifier of the subband quantity.

In one embodiment, the obtaining module includes:

a first obtaining unit, configured to obtain the one or more time-frequency resource units in the target time-frequency resource; and a second obtaining unit, configured to obtain the target overhead value based on one or more overhead values corresponding to the one or more time-frequency resource units.

In one embodiment, the target overhead value is at least one of a plurality of overhead values; and/or the target overhead value is obtained after a predetermined operation is performed on at least one of a plurality of overhead values.

In one embodiment, the determining module includes:

a first determining unit, configured to determine reference resource element information based on the target overhead value, where the reference resource element information is a value of a quantity of reference resource elements that is used to calculate the transport block size; and a second determining unit, configured to determine the transport block size based on the reference resource element information, resource block information, a modulation scheme, and a bit rate, where the resource block information is determined based on the target time-frequency resource.

For beneficial effects of the apparatus for determining a transport block size provided in the implementations of the second aspect, refer to beneficial effects brought by the implementations of the first aspect. Details are not described herein again.

According to a third aspect, an embodiment of this application provides an apparatus for determining a transport block size, where the apparatus includes a memory and a processor.

The memory is configured to store a program instruction.

The processor is configured to invoke the program instruction in the memory to perform the following operations:

obtaining a target overhead value based on a target time-frequency resource and one or more of at least two overhead values, where the target time-frequency resource is used for uplink data transmission or downlink data transmission and includes one or more time-frequency resource units, and each overhead value is corresponding to at least one time-frequency resource unit; and determining a transport block size based on the target overhead value.

In one embodiment, the overhead value is obtained from one or more pieces of overhead value information indicated by using signaling, and/or the overhead value is obtained from one or more pieces of stored overhead value information.

In one embodiment, the overhead value information includes at least one overhead value, or at least one overhead value identifier.

In one embodiment, the overhead value information further includes information about the at least one time-frequency resource unit corresponding to the overhead value, or the overhead value information further includes information about at least one time-frequency resource unit corresponding to the overhead value identifier.

In one embodiment, the time-frequency resource unit includes at least one of the following: a symbol, a slot, a resource block, a resource block group, and/or a subband.

In one embodiment, the information about the time-frequency resource unit includes at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block identifier, an identifier of the resource block identifier, a resource block group identifier, an identifier of the resource block group identifier, a subband identifier, an identifier of the subband identifier, a resource block quantity, an identifier of the resource block quantity, a resource block group quantity, an identifier of the resource block group quantity, a subband quantity, and/or an identifier of the subband quantity.

In one embodiment, the processor is specifically configured to:

obtain the one or more time-frequency resource units in the target time-frequency resource; and obtain the target overhead value based on one or more overhead values corresponding to the one or more time-frequency resource units.

In one embodiment, the target overhead value is at least one of a plurality of overhead values; and/or the target overhead value is obtained after a predetermined operation is performed on at least one of a plurality of overhead values.

In one embodiment, the processor is specifically configured to:

determine reference resource element information based on the target overhead value, where the reference resource element information is a value of a quantity of reference resource elements that is used to calculate the transport block size; and determine the transport block size based on the reference resource element information, resource block information, a modulation scheme, and a bit rate, where the resource block information is determined based on the target time-frequency resource.

For beneficial effects of the apparatus for determining a transport block size provided in the implementations of the third aspect, refer to beneficial effects brought by the implementations of the first aspect. Details are not described herein again.

According to a fourth aspect, an embodiment of this application provides apparatus for determining a transport block size, where the apparatus includes at least one processing element (or chip) configured to perform the method according to the first aspect.

According to a fifth aspect, an embodiment of this application provides a computer program product including an instruction. When the computer program product runs on a computer, the computer performs the method according to the first aspect.

According to a sixth aspect, an embodiment of this application provides a computer readable storage medium, where the computer readable storage medium stores an instruction. When the instruction runs on a computer, the computer performs the method according to the first aspect.

DESCRIPTION OF EMBODIMENTS

First, explanations and descriptions are given to application scenarios and some terms related to the embodiments of this application.

Figure 1A:
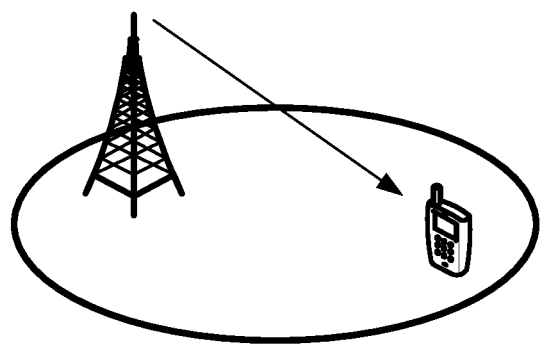
FIG. 1A is a schematic diagram 1 of an application scenario related to an embodiment of this application.
Figure 1B:
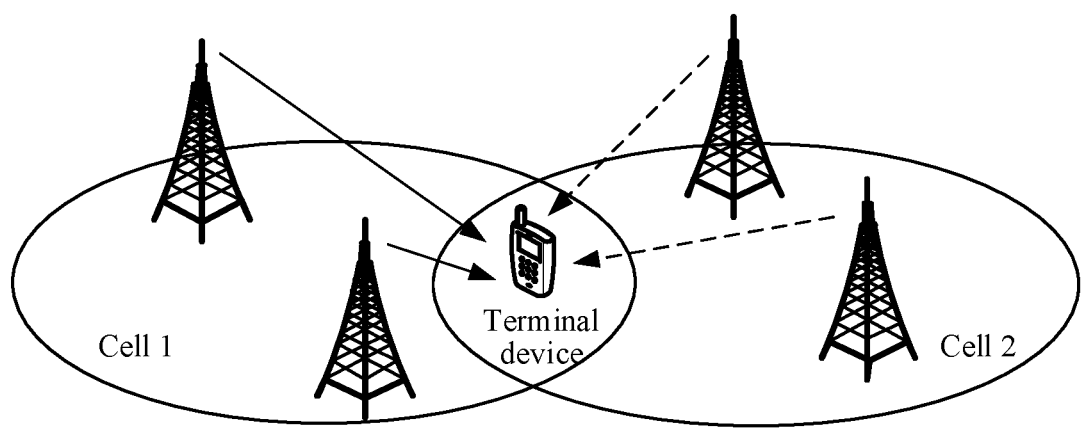
FIG. 1B is a schematic diagram 2 of an application scenario related to an embodiment of this application.

FIG. 1A is a schematic diagram 1 of an application scenario related to an embodiment of this application. FIG. 1B is a schematic diagram 2 of an application scenario related to an embodiment of this application. The embodiments of this application are applicable to a single cell transmission scenario shown in FIG. 1A, and are further applicable to a coordinated multipoint transmission/reception (CoMP) transmission scenario shown in FIG. 1B. Certainly, the embodiments of this application are also applicable to another scenario such as a homogeneous network scenario, a heterogeneous network scenario, a frequency division duplex (FDD) system, or a time division duplex (TDD) system. This is not limited in the embodiments of this application.

In the embodiments of this application, an apparatus that performs a method for determining a transport block size may be a network device, or may be an apparatus that is in the network device and that is used for determining a transport block size. For example, the apparatus that is in the network device and that is used for determining a transport block size may be a chip system, a circuit, a module, or the like. This is not limited in this application.

In the embodiments of this application, the apparatus that performs the method for determining a transport block size may be further a terminal device, or may be an apparatus that is in the terminal device and that is used for determining a transport block size. For example, the apparatus that is in the terminal device and that is used for determining a transport block size may be a chip system, a circuit, a module, or the like. This is not limited in this application.

The method and apparatus for determining a transport block size provided in the embodiments of this application are applicable to a low-frequency scenario (for example, a scenario in which a frequency is less than 6 G), or are applicable to a high-frequency scenario (for example, a scenario in which a frequency is greater than or equal to 6 G).

The CoMP in the embodiments of this application means that a plurality of transmission points at different geographical locations jointly transmit data to one terminal device, or jointly receive data sent by one terminal device, or that a plurality of transmission points perform coordinated scheduling or coordinated beamforming. For example, in FIG. 1B, a plurality of transmission points in one cell jointly transmit data to a terminal device, or a plurality of transmission points in different cells jointly transmit data to a terminal device.

A transmission point in the embodiments of this application may be used for coordinated multipoint transmission/reception between a macro base station and a macro base station, between a micro base station and a micro base station, or between a macro base station and a micro base station. Certainly, the transmission point may also be used for coordinated multipoint transmission/reception between base stations of another type. This is not limited in the embodiments of this application.

The network device in this application may be a base station. The base station is also referred to as a radio access network (RAN) device and is a device that connects a terminal device to a radio network. The base station may be a base transceiver station (BTS) in global system for mobile communications (GSM) or code division multiple access (CDMA), or may be a NodeB (NB) in wideband code division multiple access (WCDMA), or may be an evolved NodeB (eNB or eNodeB) in long term evolution (LTE), or may be a relay station or an access point, or may be a transmission reception point (TRP) or a next generation NodeB (gNB) in a new radio (NR) network. Alternatively, the base station in another network in which a plurality of technologies are integrated or other various evolved networks may have another name. This application is not limited thereto.

The terminal device (also referred to as a terminal) in this application may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks via a radio access network (RAN). The wireless terminal may be a mobile terminal such as a mobile phone (also referred to as a "cellular" phone) and a computer with a mobile terminal, for example, may be a portable, pocket-sized, handheld, computer built-in, or vehicle-mounted mobile apparatus, which exchanges voice and/or data with the radio access network. For example, the wireless terminal may be a device such as a personal communications service (PCS) phone, a cordless phone, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, a user device (user device or user equipment). The present invention is not limited thereto. The terminal device may also be briefly referred to as a terminal.

The terminal device or the network device in this application may include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a Unix operating system, an Android operating system, an iOS operating system, or a windows operating system. The application layer includes applications such as a browser, an address book, text processing software, and instant messaging software.

In the embodiments of this application, the network device may allocate a bandwidth resource in a system frequency resource to the terminal device, and allocate some or all resources in the bandwidth resource to the terminal device for communication between the network device and the terminal device. Alternatively, the network device may directly allocate some or all resources in a bandwidth resource (which belongs to a system frequency resource) to the terminal device for communication between the network device and the terminal device. In one embodiment, the bandwidth resource may be some consecutive or inconsecutive resources in the system frequency resource, or may be all resources in the system frequency resource. The bandwidth resource (also referred to as a bandwidth part (BWP)) may also be referred to as a frequency resource part, some frequency resources, or a carrier bandwidth part, or may have another name. This is not limited in the embodiments of this application. When the bandwidth resource is a segment of consecutive resources in the system frequency resource, the bandwidth resource may also be referred to as a subband or a narrowband, or may have another name. This is not limited in the embodiments of this application.

A bandwidth resource in the embodiments of this application is related to a specific system parameter. The system parameter includes at least one of a subcarrier spacing and a cyclic prefix (CP) type. Certainly, the system parameter may further include another parameter. This is not limited in the embodiments of this application.

Figure 1C:
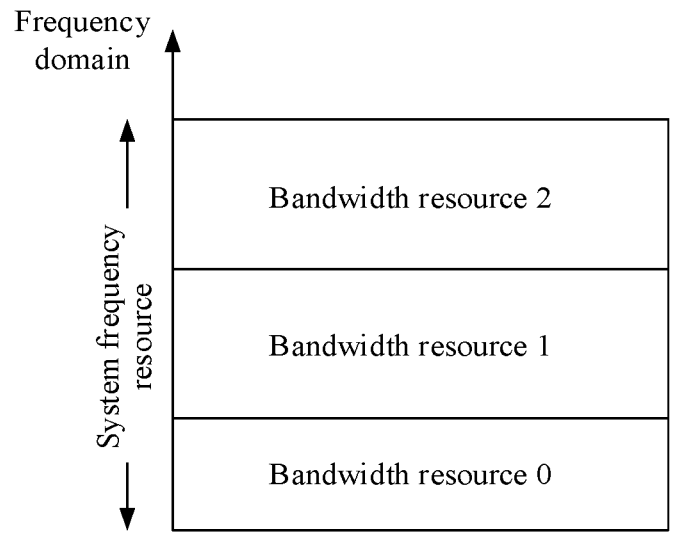
FIG. 1C is a schematic structural diagram of a bandwidth resource according to an embodiment of this application.

FIG. 1C is a schematic structural diagram of a bandwidth resource according to an embodiment of this application. As shown in FIG. 1C, a system frequency resource includes three different bandwidth resources: a bandwidth resource 0, a bandwidth resource 1, and a bandwidth resource 2. In actual application, a system frequency resource may include any integer quantity of bandwidth resources. This is not limited in this application.

The bandwidth resource 0 and the bandwidth resource 1 are used as an example to describe meanings of different bandwidth resources. That the bandwidth resource 0 is different from the bandwidth resource 1 may mean at least one of the following: (1). There is no intersection set between the bandwidth resource 0 and the bandwidth resource 1. (2). There is an intersection set between the bandwidth resource 0 and the bandwidth resource 1. (3). The bandwidth resource 0 is a proper subset of the bandwidth resource 1, or the bandwidth resource 1 is a proper subset of the bandwidth resource 0. (4). The bandwidth resource 0 and the bandwidth resource 1 belong to a same frequency resource, but a system parameter corresponding to the bandwidth resource 0 is different from a system parameter corresponding to the bandwidth resource 0 (in one embodiment, the system parameter may include but is not limited to a subcarrier spacing and a CP type).

A target time-frequency resource in the embodiments of this application is a resource that is in the bandwidth resource and that is allocated by the network device to the terminal device. The target time-frequency resource is used for data transmission.

A time-frequency resource unit in the embodiments of this application may include at least one of the following: a symbol, a slot, a resource block, a resource block group, and/or a subband.

Information about a time-frequency resource unit in the embodiments of this application may include at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block (RB) identifier, an identifier of the resource block identifier, a resource block group (RBG) identifier, an identifier of the resource block group identifier, a subband identifier, an identifier of the subband identifier, a resource block quantity, an identifier of the resource block quantity, a resource block group quantity, an identifier of the resource block group quantity, a subband quantity, and/or an identifier of the subband quantity.

The symbol identifier in the embodiments of this application may be information used to identify a symbol, such as a symbol index or a symbol number. This is not limited in the embodiments of this application.

The slot identifier in the embodiments of this application may be information used to identify a slot, such as a slot index or a slot number. This is not limited in the embodiments of this application.

The RB identifier in the embodiments of this application may be information used to identify an RB, such as an RB index or an RB number. This is not limited in the embodiments of this application.

The RBG identifier in the embodiments of this application may be information used to identify an RBG, such as an RBG index or an RBG number. This is not limited in the embodiments of this application.

The subband identifier in the embodiments of this application may be information used to identify a subband, such as a subband index or a subband number. This is not limited in the embodiments of this application.

An overhead value corresponding to a time-frequency resource unit in the embodiments of this application may be a quantity of REs that cannot be used for data transmission in the time-frequency resource unit, or may be a quantity of REs that cannot be used for data transmission other than a quantity of REs of a demodulation reference signal (DMRS). In one embodiment, the overhead value corresponding to the time-frequency resource unit may be determined based on at least one of a quantity of REs used to transmit a control signal, a quantity of REs of a pilot signal, a reserved resource, a rate matching resource (resource set), and the like.

For example, considering that the network device and the terminal device usually need to simultaneously transmit some other signals (for example, pilot signals) in a data transmission process. Therefore, a quantity of REs required for transmitting the other signals is an overhead value of data transmission.

Data in the embodiments of this application may be service data in a narrow sense.

The data in the embodiments of this application may also be understood in a broad sense. For example, any signal may be referred to as data. For example, a control signal may also be referred to as data.

An overhead value in the embodiments of this application may be a multiple of 0 (for example, 3, 4, or 6), and 0 (which is a positive integer) may be predefined, or may be indicated by using signaling.

A control signal in the embodiments of this application may include but is not limited to at least one of the following: a control resource set (CORESET), an uplink control channel, a downlink control channel, and the like. Certainly, the control signal may further include another signal. This is not limited in the embodiments of this application.

A pilot signal in the embodiments of this application may include but is not limited to at least one of the following: a channel state information-reference signal (CSI-RS), a synchronization signal block (SS block), a physical broadcast channel (PBCH), a DMRS, a phase tracking reference signal (PTRS), and a synchronization tracking reference signal (TRS). Certainly, the pilot signal may further include another signal. This is not limited in the embodiments of this application.

Generally, to efficiently complete data transmission, the network device and/or the terminal device need or needs to accurately determine a TBS before data transmission is performed.

With development of communications technologies, there are different quantities of available REs on different time-frequency resources. Therefore, how to accurately determine a TBS in a communications system (for example, an NR communications system or a future communications system) is an urgent problem to be resolved.

According to the method and apparatus for determining a transport block size provided in the embodiments of this application, a target overhead value is obtained based on a target time-frequency resource and one or more of at least two overhead values, where the target time-frequency resource includes one or more time-frequency resource units, and each overhead value is corresponding to at least one time-frequency resource unit; and further, a transport block size is determined based on the target overhead value. It can be learned that, according to the method and apparatus for determining a transport block size provided in the embodiments of this application, a corresponding target overhead value may be determined for each of different target time-frequency resources. This is not only applicable to a scenario in which a dynamic time-frequency resource is scheduled, but also improves accuracy of determining the TBS. Therefore, transmission performance is improved.

The following uses specific embodiments to describe in detail the technical solutions in this application and how the foregoing technical problem is resolved in the technical solutions in this application. The following several specific embodiments may be combined with each other, and a same or similar concept or process may not be described repeatedly in some embodiments.

Figure 2:
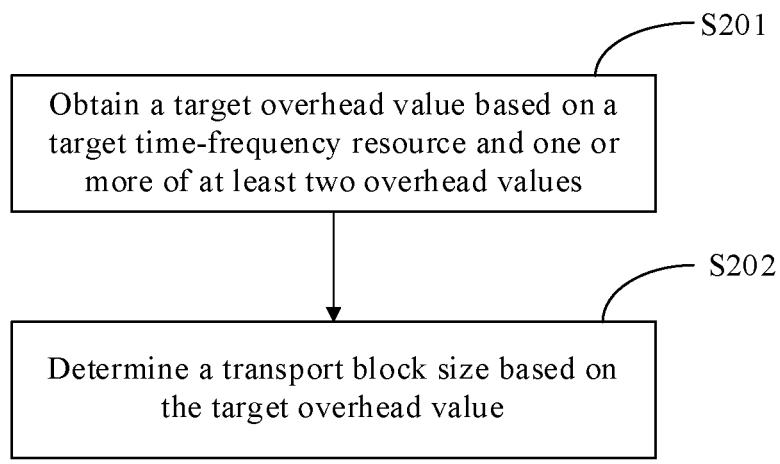
FIG. 2 is a schematic flowchart of Embodiment 1 of a method for determining a transport block size according to this application.

FIG. 2 is a schematic flowchart of Embodiment 1 of a method for determining a transport block size according to this application. As shown in FIG. 2, the method in this embodiment of this application may include the following operations.

This embodiment of this application may be an independent embodiment, or may be combined with another embodiment of this application. Specifically, this is not limited herein.

Operation S201: Obtain a target overhead value based on a target time-frequency resource and one or more of at least two overhead values.

Each overhead value is corresponding to at least one time-frequency resource unit. The target time-frequency resource is used for uplink data transmission or downlink data transmission, and the target time-frequency resource includes one or more time-frequency resource units.

In one embodiment, the overhead value may be obtained from one or more pieces of overhead value information indicated by using signaling, and/or the overhead value may be obtained from one or more pieces of stored overhead value information. For example, if an apparatus that performs the method in this embodiment is located in a terminal device, the overhead value may be obtained from one or more pieces of overhead value information indicated by using signaling sent by a network device, or may be obtained from one or more pieces of stored overhead value information. For another example, if an apparatus that performs the method in this embodiment is located in a network device, the overhead value may be determined by the network device, or may be obtained from one or more pieces of stored overhead value information.

In this embodiment of this application, the following describes content carried in the overhead value information.

Specifically, at least one of the following implementations may be used.

In a first implementation, the overhead value information may include at least one overhead value and/or at least one overhead value identifier. Certainly, the overhead value information may further include other information. This is not limited in this embodiment of this application.

In one embodiment, the overhead value information may be used to indicate the at least one overhead value and/or the at least one overhead value identifier.

In one embodiment, the at least one overhead value and/or the at least one overhead value identifier may be determined based on the overhead value information.

In one embodiment, if the overhead value information is used to indicate at least two overhead values and/or at least two overhead value identifiers, the at least two overhead values may be obtained by using the only one piece of overhead value information; or if each piece of overhead value information is used to indicate one overhead value and/or one overhead value identifier, at least two pieces of overhead value information are needed to obtain at least two overhead values.

For example, if the overhead value information includes at least one overhead value, the at least one overhead value is obtained by obtaining the overhead value information. For example, if the overhead value information includes at least one overhead value identifier (in one embodiment, each overhead value identifier may be an identifier of an overhead value in an overhead value set, for example, an index of the overhead value in the overhead value set), at least one overhead value is determined based on the at least one overhead value identifier and an overhead value set. In one embodiment, the overhead value set may be indicated by using signaling, or may be predefined. It should be noted that the signaling used to indicate the one or more pieces of overhead value information may be the same as or different from the signaling used to indicate the overhead value set. A plurality of pieces of overhead value information may be indicated by using same signaling, or may be indicated by using a plurality of signaling. This is not limited in this embodiment of this application.

In one embodiment, the overhead value information may include an overhead value set and/or an overhead value identifier set. In one embodiment, the overhead value set may be in a form of a set, and the overhead value set includes at least one overhead value. For example, the overhead value set is at least one value in {4, 6, 9, 12, 18, 24, 36, ... }.

In one embodiment, the overhead value information may be used to indicate one or more overhead value sets and/or one or more overhead value identifier sets.

In one embodiment, the one or more overhead value sets and/or the one or more overhead value identifier sets may be determined based on the overhead value information.

For example, the overhead value information may be used to indicate an overhead value set 1 and an overhead value set 2, the overhead value set 1 is at least one value in {4, 6, 9, 12, 18, 24, 36, ... }, and the overhead value set 2 is at least one value in {1, 2, 4, 6, 8, 10, ... }.

In one embodiment, a specific to-be-used overhead value set and/or overhead value identifier set may be predefined, or may be indicated by using signaling. In one embodiment, the overhead value set and/or the overhead value identifier set may also be in a form of a table, for example, one table or a plurality of tables (a specific to-be-used table may be predefined, or may be indicated by using signaling). Certainly, the overhead value set and/or the overhead value identifier set may also be in another form. This is not limited in this embodiment of this application.

In this embodiment, when the overhead value information includes at least one overhead value and/or at least one overhead value identifier, at least one time-frequency resource unit corresponding to each overhead value needs to be determined based on a correspondence between an overhead value and a time-frequency resource unit, so as to further obtain the target overhead value based on the target time-frequency resource. In one embodiment, the correspondence between the overhead value and the time-frequency resource unit may be indicated by using signaling, or may be predefined.

The signaling in this embodiment of this application may be at least one of higher layer signaling and physical layer signaling. The higher layer signaling may be at least one of radio resource control (RRC) signaling and medium access control (MAC) signaling. Certainly, the signaling in this embodiment of this application may also be other signaling. This is not limited.

In a second implementation, in addition to the at least one overhead value and/or the at least one overhead value identifier, the overhead value information may further include information about at least one time-frequency resource unit corresponding to the overhead value and/or information about at least one time-frequency resource unit corresponding to the overhead value identifier. For example, in addition to the at least one overhead value, the overhead value information may further include information about at least one time-frequency resource unit corresponding to each overhead value; or in addition to the at least one overhead value identifier, the overhead value information may further include information about at least one time-frequency resource unit corresponding to each overhead value identifier; or in addition to the at least one overhead value and the at least one overhead value identifier, the overhead value information may further include information about at least one time-frequency resource unit corresponding to each overhead value and information about at least one time-frequency resource unit corresponding to each overhead value identifier.

In one embodiment, if in addition to at least two overhead values and/or at least two overhead value identifiers, the overhead value information may further include information about a time-frequency resource unit corresponding to each overhead value and/or information about a time-frequency resource unit corresponding to each overhead value identifier, the at least two overhead values and the information about the time-frequency resource unit corresponding to each overhead value may be obtained by using the only one piece of overhead value information. If in addition to one overhead value and/or one overhead value identifier, the overhead value information may further include information about a time-frequency resource unit corresponding to the overhead value and/or information about a time-frequency resource unit corresponding to the overhead value identifier, at least two overhead values and information about a time-frequency resource unit corresponding to each overhead value need to be obtained by using at least two pieces of overhead value information.

For example, the one or more pieces of overhead value information may be indicated or stored in a form of a table, such as Table 1, Table 2, or Table 3 (certainly, another table may also be used, and this is not limited herein). Certainly, the one or more pieces of overhead value information may also be indicated or stored in another form. This is not limited in this embodiment of this application. It should be noted that, in each table in this embodiment of this application, one of the overhead value and the overhead value identifier may be used, or both of the overhead value and the overhead value identifier may be used.

TABLE 1 schematic table 1 of a form of overhead value information
Information about a

| time-frequency resource unit | Overhead value | Overhead value identifier |
|---|---|---|
| Information about a time-frequency resource unit 1 | Overhead value 1 | Identifier of the overhead value 1 |
| Information about a time-frequency resource unit 2 | Overhead value 2 | Identifier of the overhead value 2 |

TABLE 2 schematic table 2 of a form of overhead value information

| Information about a time-frequency resource unit | Overhead value | Overhead value identifier |
|---|---|---|
| Information about a time-frequency resource unit 1 to information about a time-frequency resource unit 3 | Overhead value 1 | Identifier of the overhead value 1 |
| Information about a time-frequency resource unit 1 to information about a time-frequency resource unit 5 | Overhead value 2 | Identifier of the overhead value 2 |

TABLE 3 schematic table 3 of a form of overhead value information

| Information about a time-frequency resource unit | Overhead value | Overhead value identifier |
|---|---|---|
| Information about a time-frequency resource unit 1 to information about a time-frequency resource unit 3 | Overhead value 1 | Identifier of the overhead value 1 |
| Information about a time-frequency resource unit 4 and information about a time-frequency resource unit 5 | Overhead value 2 | Identifier of the overhead value 2 |

It should be noted that if the overhead value information is used to indicate an overhead value, the overhead value information is shown in the first two columns of Table 1 to Table 3; or if the overhead value information is used to indicate an overhead value identifier, the overhead value information is shown in first columns and third columns of Table 1 to Table 3; or if the overhead value information is used to indicate an overhead value and an overhead value identifier, the overhead value information is shown in three columns of Table 1 to Table 3.

It should be noted that Table 1 to Table 3 are only example tables, and no limitation is imposed on information about each time-frequency resource unit and a quantity and/or a sequence of overhead values or overhead value identifiers.

In one embodiment, information about a time-frequency resource unit may be used to indicate the time-frequency resource unit.

In one embodiment, a time-frequency resource unit may be determined based on the information about the time-frequency resource unit.

For example, if the information about the time-frequency resource unit includes an identifier of a symbol identifier, the identifier of the symbol identifier may be an identifier of the symbol identifier in a symbol identifier set. For example, if the information about the time-frequency resource unit includes an identifier of a symbol quantity, the identifier of the symbol quantity may be an identifier of the symbol quantity in a symbol quantity set.

In one embodiment, a time-frequency resource unit set may be indicated by using signaling, or may be predefined. In one embodiment, the time-frequency resource unit set may be at least one of the following: a symbol identifier set, a set of identifiers of symbol identifiers, a symbol quantity set, a set of identifiers of symbol quantities, a slot identifier set, a set of identifiers of slot identifiers, a slot quantity set, a set of identifiers of slot quantities, an RB identifier set, a set of identifiers of resource block identifiers, an RBG identifier set, a set of identifiers of resource block group identifiers, a subband identifier set, a set of identifiers of subband identifiers, a resource block quantity set, a set of identifiers of resource block quantities, a resource block group quantity set, a set of identifiers of resource block group quantities, a subband quantity set, and a set of identifiers of the subband quantities.

It should be noted that the signaling used to indicate the one or more pieces of overhead value information may be the same as or different from the signaling used to indicate the time-frequency resource unit set (alternatively, the signaling used to indicate the one or more pieces of overhead value information and the signaling used to indicate the time-frequency resource unit set may be sent by using one piece of signaling, or may be sent by using a plurality of pieces of signaling). This is not limited in this embodiment of this application.

In one embodiment, the time-frequency resource unit set may be in a form of a set, or may be in a form of a table, or the like. Certainly, the time-frequency resource unit set may be in another form. This is not limited in this embodiment of this application.

In this embodiment, when the overhead value information includes the at least one overhead value and/or the at least one overhead value identifier, and the information about the time-frequency resource unit corresponding to each overhead value and/or the information about the time-frequency resource unit corresponding to each overhead value identifier, the at least one overhead value and the time-frequency resource unit corresponding to each overhead value may be determined based on the overhead value information, so as to further obtain the target overhead value based on the target time-frequency resource.

The target overhead value in this embodiment of this application may be at least one of a plurality of overhead values; and/or the target overhead value is obtained after a predetermined operation is performed on at least one of a plurality of overhead values.

In one embodiment, the predetermined operation may be at least one of a subtraction operation, an addition operation, and an equivalence operation. Certainly, the predetermined operation may be another operation. This is not limited in this embodiment of this application.

In this operation, in one embodiment, the one or more time-frequency resource units in the target time-frequency resource are obtained, and the target overhead value is obtained based on one or more overhead values corresponding to the one or more time-frequency resource units.

For example, each time-frequency resource unit included in the target time-frequency resource is compared with one or more time-frequency resource units corresponding to the one or more of the at least two overhead values, and an overhead value corresponding to the target time-frequency resource may be determined in at least one of the following manners.

(I) If a time-frequency resource unit included in the target time-frequency resource belongs to the time-frequency resource units corresponding to the one or more of the at least two overhead values, it is determined that the one or more overhead values are one or more overhead values corresponding to the target time-frequency resource, and the target overhead value is obtained after the predetermined operation is performed on the overhead values corresponding to the target time-frequency resource. For example, assuming that the target time-frequency resource includes a time-frequency resource unit 1 and a time-frequency resource unit 2, an overhead value A is corresponding to the time-frequency resource unit 1, and an overhead value B is corresponding to the time-frequency resource unit 2, it is determined that the overhead value A and the overhead value B are the overhead values corresponding to the target time-frequency resource.

(II) If no time-frequency resource unit included in the target time-frequency resource belongs to the time-frequency resource units corresponding to the one or more of the at least two overhead values, a quantized time-frequency resource unit corresponding to the target time-frequency resource is determined, according to a preset quantization rule (for example, a rule of selecting a larger value in an interval or a rule of selecting a smaller value in an interval), in the time-frequency resource units corresponding to the one or more of the at least two overhead values. In this case, an overhead value corresponding to the quantized time-frequency resource unit is determined as the overhead value corresponding to the target time-frequency resource, and the target overhead value is obtained after a predetermined operation is performed on the overhead value corresponding to the target time-frequency resource. For example, assuming that the target time-frequency resource includes a time-frequency resource unit 2 and a time-frequency resource unit 4, an overhead value A is corresponding to a time-frequency resource unit 1, and an overhead value B is corresponding to a time-frequency resource unit 3, it is determined, according to the preset quantization rule (for example, the rule of selecting a smaller value in an interval), that the time-frequency resource unit 1 is a quantized time-frequency resource unit of the time-frequency resource unit 2, and that the time-frequency resource unit 3 is a quantized time-frequency resource unit of the time-frequency resource unit 4. In this case, the overhead value A and the overhead value B are determined as overhead values corresponding to the target time-frequency resource.

(III) If a first part of the one or more time-frequency resource units included in the target time-frequency resource is the time-frequency resource units corresponding to the one or more of the at least two overhead values (in other words, the one or more overhead values are one or more overhead values corresponding to the first part of the one or more time-frequency resource units), and if a second part of the one or more time-frequency resource units included in the target time-frequency resource is not the time-frequency resource units corresponding to the one or more of the at least two overhead values, one or more quantized time-frequency resource units corresponding to the second part of the one or more time-frequency resource units is determined, based on a preset quantization rule (for example, a rule of selecting a larger value in an interval or a rule of selecting a smaller value in an interval), in the time-frequency resource units corresponding to the one or more of the at least two overhead values (in other words, one or more overhead values corresponding to the quantized time-frequency resource units are overhead values corresponding to the second part of the one or more time-frequency resource units), and further, the target overhead value is obtained after the predetermined operation is performed on the overhead values corresponding to the first part of the one or more time-frequency resource units and on the overhead values corresponding to the second part of the one or more time-frequency resource units. For example, assuming that the target time-frequency resource includes a time-frequency resource unit 1 and a time-frequency resource unit 3, an overhead value A is corresponding to the time-frequency resource unit 1, and an overhead value B is corresponding to a time-frequency resource unit 4, it is determined, according to the preset quantization rule (for example, the rule of selecting a larger value in an interval), that the time-frequency resource unit 4 is a quantized time-frequency resource unit of the time-frequency resource unit 3. In this case, the overhead value A and the overhead value B are determined as overhead values corresponding to the target time-frequency resource.

Certainly, the one or more overhead values corresponding to the one or more time-frequency resource units in the target time-frequency resource may also be obtained in another manner, and the target overhead value is obtained based on the one or more overhead values corresponding to the one or more time-frequency resource units. This is not limited in this embodiment of this application.

Certainly, the target overhead value may also be obtained based on the target time-frequency resource and the one or more of the at least two overhead values in another manner. This is not limited in this embodiment of this application.

Operation S202: Determine a transport block size based on the target overhead value.

In this operation, in one embodiment, reference resource element information is determined based on the target overhead value. The reference resource element information may be a value of a quantity of reference resource elements (or referred to as a quantity of quantized resource elements, a quantity of baseline resource elements, a quantity of reference resource elements, or the like) that is used to calculate the transport block size. In one embodiment, the value of the quantity of reference resource elements may be a quantity of reference REs in one RB and one slot, or may be a quantity of reference REs in one RB and one symbol, or may be a quantity of reference REs in N1 RBs and M1 symbols, or may be a quantity of reference REs in N2 RBs and M2 slots, or may be a quantity of reference REs in N3 RBGs and M3 symbols, or may be a quantity of reference REs in N4 RBGs and M4 slots. N1, N2, N3, N4, M1, M2, M3, and M4 are positive integers. A specific value of the quantity of reference resource elements may be predefined, or may be indicated by using signaling. This is not limited herein.

In one embodiment, the value of the quantity of reference resource elements may be a quantity of REs obtained through calculation based on a quantity of REs occupied by a DMRS and the target overhead value, or may be a quantity of reference REs obtained after the quantity of REs obtained through calculation is quantized. The target overhead value may be an overhead value determined based on a quantity of REs occupied by at least one of the following signals or channels: a CSI-RS, a CORESET, a reserved resource, a rate matching resource (resource set), a PTRS, an SS block, a PBCH, a TRS, and the like.

Further, the transport block size is determined based on the reference resource element information, resource block information, a modulation scheme, and a bit rate. The resource block information is determined based on the target time-frequency resource. In one embodiment, the transport block size TBS is determined based on a formula TBS=$N_{RB} \cdot N_{RE}^{reference} \cdot Q_m \cdot R$. Certainly, the TBS may also be determined based on another equivalent or variant formula of the foregoing formula. This is not limited in this embodiment of this application.

Herein, $N_{RE}^{reference}$ refers to the reference resource element information.

$N_{RB}$ refers to the resource block information. Specifically, the resource block information may be a quantity of allocated RBs, or may be a quantity of RBs obtained after quantization is performed based on the reference resource element information, or may be an RBG quantity, or may be a quantity of elements obtained by multiplying a quantity of elements in frequency domain by a quantity of elements in time domain (for example, a slot quantity or a symbol quantity). This is not specifically limited. Specific resource block information may be predefined, or may be indicated by using signaling. This is not limited herein.

$Q_m$ refers to the modulation scheme. In one embodiment, the modulation scheme may include but is not limited to at least one of the following: quadrature phase shift keying (QPSK), 16 quadrature amplitude modulation (QAM), 64 QAM, and 1024 QAM.

R refers to the bit rate. In one embodiment, the TBS determined based on the bit rate may be a TBS that includes a CRC, or may be a TBS that does not include a CRC. This is not limited herein. A specific bit rate may be predefined, or may be indicated by using signaling. This is not limited herein.

Certainly, the transport block size may also be determined based on the target overhead value in another manner. This is not limited in this embodiment of this application.

In this embodiment of this application, the target overhead value is obtained based on the target time-frequency resource and the one or more of the at least two overhead values, where the target time-frequency resource includes the one or more time-frequency resource units, and each overhead value is corresponding to the at least one time-frequency resource unit; and further, the transport block size is determined based on the target overhead value. It can be learned that, according to the method for determining a transport block size provided in this embodiment of this application, a corresponding target overhead value may be determined for each of different target time-frequency resources. This is not only applicable to a scenario in which a dynamic time-frequency resource is scheduled, but also improves accuracy of determining the TBS. Therefore, transmission performance is improved.

Based on the foregoing embodiment, in Embodiment 2 of the method for determining a transport block size according to this application, an example in which information about a time-frequency resource unit includes at least one of a symbol identifier, an identifier of the symbol identifier, a symbol quantity, an identifier of the symbol quantity, a slot quantity, and an identifier of the slot quantity (in time domain) is used to explain and describe the foregoing operation S201.

This embodiment of this application may be an independent embodiment, or may be combined with another embodiment of this application. Specifically, this is not limited herein.

In this embodiment, different time-frequency resource units corresponding to overhead values are used as examples for description.

The following methods in this embodiment may be combined with each other. Specifically, this is not limited herein.

(1) For example, it is assumed that information about a time-frequency resource unit corresponding to each overhead value includes a first symbol (for example, a symbol 1) to an $N^{th}$ symbol (for example, a symbol N) (where N represents a symbol identifier, and N is a positive integer greater than or equal to 2). It should be noted that an example in which the symbol identifier is numbered from 1 is used for description in this embodiment. Certainly, the symbol identifier may also be numbered from 0, in other words, the first symbol is a symbol 0. Alternatively, the symbol identifier may be numbered from another value. This is not limited in this embodiment of this application.

Figure 3A:
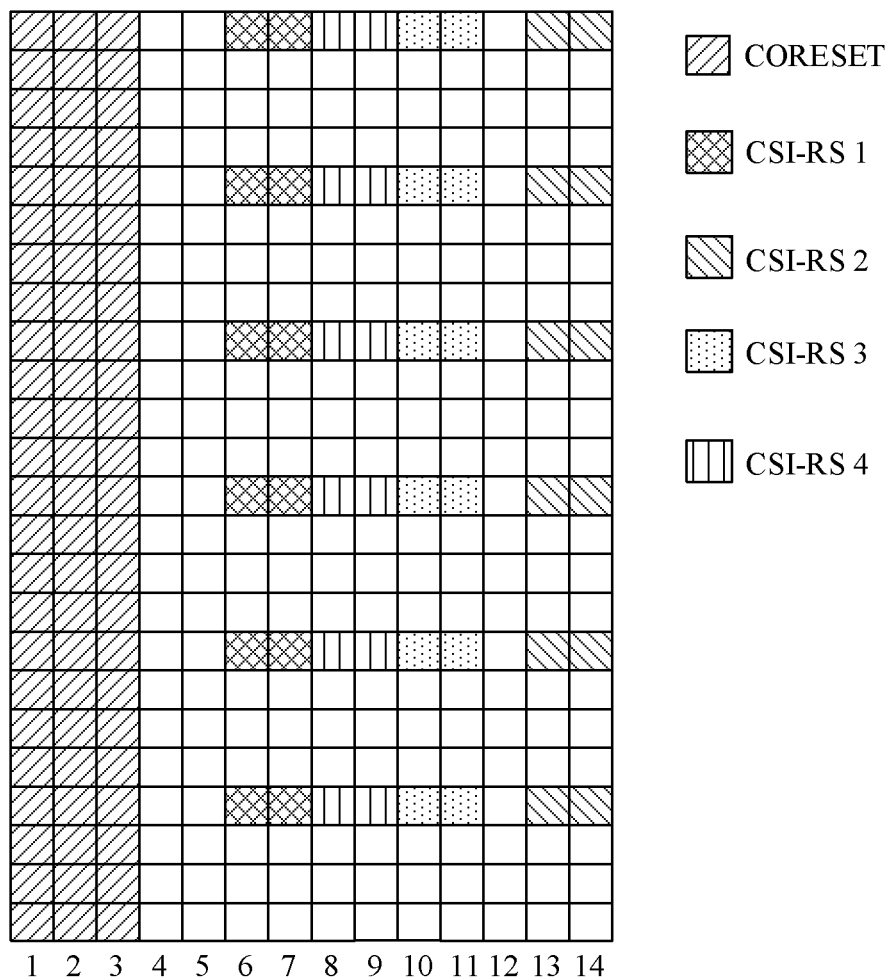
FIG. 3A is a schematic structural diagram 1 of a time-frequency resource according to an embodiment of this application.

As shown in FIG. 3A, it is assumed that an overhead value A1 corresponding to a first symbol to a third symbol is 36, an overhead value B1 corresponding to the first symbol to a seventh symbol is 42, an overhead value C1 corresponding to the first symbol to a ninth symbol is 48, an overhead value D1 corresponding to the first symbol to an eleventh symbol is 54, and an overhead value E1 corresponding to the first symbol to a fourteenth symbol is 60.

It should be noted that FIG. 3A is only an example, and locations or a location of a pilot signal (for example, a CSI-RS 1 to a CSI-RS 4) and/or a control signal (for example, a CORESET) and quantities or a quantity of REs occupied by the pilot signal and/or the control signal are not limited.

In one embodiment, in this embodiment of this application, the overhead value may be determined based on locations or a location of a pilot signal (for example, a CSI-RS) and/or a control signal (for example, a CORESET) and quantities or a quantity of REs occupied by the pilot signal and/or the control signal. Certainly, the overhead value may not be equal to a quantity of actually available REs, or the overhead value may not be equal to the quantities or the quantity of REs occupied by the pilot signal (for example, the CSI-RS) and/or the control signal (for example, the CORESET). For example, based on other considerations, a network device may notify the overhead value that is not equal to the quantity of actually available REs, or the overhead value that is not equal to the quantities or the quantity of REs occupied by the pilot signal (for example, the CSI-RS) and/or the control signal (for example, the CORESET).

In one embodiment, the at least two overhead values (for example, the overhead value A1 to the overhead value E1) in operation S201 may be obtained based on one or more pieces of overhead value information indicated by using signaling or one or more pieces of stored overhead value information. Specifically, at least one of the following three implementations may be used.

In a first implementation, the one or more pieces of overhead value information may include the at least two overhead values or overhead value identifiers corresponding to the at least two overhead values. In a second implementation, the one or more pieces of overhead value information may include the at least two overhead values and information about at least one time-frequency resource unit corresponding to each overhead value, for example, as shown in Table 4 (an example in which information about a time-frequency resource unit includes a symbol identifier is used). In a third implementation, the one or more pieces of overhead value information may include an overhead value identifier corresponding to each of the at least two overhead values and information about at least one time-frequency resource unit corresponding to each overhead value identifier. Herein, information about a time-frequency resource unit is a symbol identifier. A range of the symbol identifier may be used to represent a correspondence between the at least one time-frequency resource unit and the overhead value.

TABLE 4 schematic table 4 of a form of overhead value information

| Symbol identifier | Overhead value |
|---|---|
| 1-3 | A1 (for example, 36) |
| 1-7 | B1 (for example, 42) |
| 1-9 | C1 (for example, 48) |
| 1-11 | D1 (for example, 54) |
| 1-14 | E1 (for example, 60) |

Correspondingly, with reference to Table 4, assuming that a target time-frequency resource includes a fourth symbol to the seventh symbol, a target overhead value is a difference between the overhead value B1 (42) corresponding to the first symbol to the seventh symbol and the overhead value A1 (36) corresponding to the first symbol to the third symbol. Alternatively, assuming that the target time-frequency resource includes the fourth symbol to the ninth symbol, the target overhead value is a difference between the overhead value C1 (48) corresponding to the first symbol to the ninth symbol and the overhead value A1 (36) corresponding to the first symbol to the third symbol. Alternatively, assuming that the target time-frequency resource includes an eighth symbol to the fourteenth symbol, the target overhead value is a difference between the overhead value E1 (60) corresponding to the first symbol to the fourteenth symbol and the overhead value B1 (42) corresponding to the first symbol to the seventh symbol. It can be learned that the target overhead value may be obtained after a predetermined operation (for example, a subtraction operation) is performed on at least one of a plurality of overhead values.

For example, assuming that a time-frequency resource unit set is a symbol identifier set, an identifier of a symbol identifier is an identifier (or an index) of the symbol identifier in the symbol identifier set. For example, the symbol identifier set is at least one of {1-3, 1-7, 1-9, 1-11, 1-14, . . . }, the identifier of the symbol identifier is as follows: an identifier 1 of a symbol identifier represents the symbol identifiers 1 to 3, an identifier 2 of a symbol identifier represents the symbol identifiers 1 to 7, an identifier 3 of a symbol identifier represents the symbol identifier 1 to 9, an identifier 4 of a symbol identifier represents symbol the identifiers 1 to 11, and so on. It should be noted that the identifier (or the index) of the symbol identifier may also be numbered from 0. This is not specifically limited here. Correspondingly, Table 4 may be represented as the following Table 5:

TABLE 5 schematic table 5 of a form of overhead value information

| Identifier of a symbol identifier | Overhead value |
|---|---|
| 1 | A1 (for example, 36) |
| 2 | B1 (for example, 42) |
| 3 | C1 (for example, 48) |
| 4 | D1 (for example, 54) |
| 5 | E1 (for example, 60) |

(2) For example, it is assumed that information about a time-frequency resource unit corresponding to each overhead value includes an $M^{th}$ symbol to a $P^{th}$ symbol (where both M and P represent symbol identifiers, both M and P are positive integers, and P is greater than or equal to M). It should be noted that an example in which the symbol identifier is numbered from 1 is used for description in this embodiment. Certainly, the symbol identifier may also be numbered from 0, in other words, the first symbol is a symbol 0. Alternatively, the symbol identifier may be numbered from another value. This is not limited in this embodiment of this application.

As shown in FIG. 3A, it is assumed that an overhead value A2 corresponding to the first symbol to the third symbol is 36, an overhead value B2 corresponding to the fourth symbol to the seventh symbol is 6, an overhead value C2 corresponding to the eighth symbol and the ninth symbol is 6, an overhead value D2 corresponding to a tenth symbol and the eleventh symbol is 6, and an overhead value E2 corresponding to a twelfth symbol to the fourteenth symbol is 6.

In one embodiment, the at least two overhead values (for example, the overhead value A2 to the overhead value E2) in operation S201 may be obtained based on one or more pieces of overhead value information indicated by using signaling or one or more pieces of stored overhead value information. Specifically, at least one of the following three implementations may be used.

In a first implementation, the one or more pieces of overhead value information may include the at least two overhead values or overhead value identifiers corresponding to the at least two overhead values. In a second implementation, the one or more pieces of overhead value information may include the at least two overhead values and information about at least one time-frequency resource unit corresponding to each overhead value, for example, as shown in Table 6 (an example in which information about a time-frequency resource unit includes a symbol identifier is used). In a third implementation, the one or more pieces of overhead value information may include an overhead value identifier corresponding to each of the at least two overhead values and information about at least one time-frequency resource unit corresponding to each overhead value identifier.

TABLE 6 schematic table 6 of a form of overhead value information

| Symbol identifier | Overhead value |
|---|---|
| 1-3 | A2 (for example, 36) |
| 4-7 | B2 (for example, 6) |
| 8-9 | C2 (for example, 6) |
| 10-11 | D2 (for example, 6) |
| 12-14 | E2 (for example, 6) |

Correspondingly, with reference to Table 6, assuming that a target time-frequency resource includes the fourth symbol to the seventh symbol, a target overhead value is B2 (6). Alternatively, assuming that the target time-frequency resource includes the fourth symbol to the ninth symbol, the target overhead value is a sum (12) of the overhead value B2 (6) corresponding to the fourth symbol to the seventh symbol and the overhead value C2 (6) corresponding to the eighth symbol and the ninth symbol. Alternatively, assuming that the target time-frequency resource includes the eighth symbol to the fourteenth symbol, the target overhead value is a sum (18) of the overhead value C2 (6) corresponding to the eighth symbol and the ninth symbol, the overhead value D2 (6) corresponding to the tenth symbol and the eleventh symbol, and the overhead value E2 (6) corresponding to the twelfth symbol to the fourteenth symbol. It can be learned that the target overhead value may be obtained after a predetermined operation (for example, an adding operation) is performed on at least one of a plurality of overhead values.

For example, assuming that an overhead value set is at least one of {36, 6, . . . }, an overhead value identifier (or an index) corresponding to 36 is 1, an overhead value identifier (or an index) corresponding to 6 is 2, and so on. It should be noted that the overhead value identifier (or the index) may also be numbered from 0. This is not specifically limited here. Correspondingly, Table 6 may be represented as the following Table 7:

TABLE 7 schematic table 7 of a form of overhead value information

| Symbol identifier | Overhead value identifier |
| --- | --- |
| 1-3 | 1 |
| 4-7 | 2 |
| 8-9 | 2 |
| 10-11 | 2 |
| 12-14 | 2 |

It should be noted that Table 6 is only an example table, and a range, a quantity, and/or a sequence of symbol identifiers corresponding to each overhead value are/is not limited. For example, "symbol identifiers 6 and 7" may replace "symbol identifiers 4 to 7". Alternatively, "symbol identifiers 4 and 5" and an overhead value corresponding to the "symbol identifiers 4 and 5" may be further added. Similarly, Table 7 may be modified correspondingly.

(3) For example, if information about a time-frequency resource unit corresponding to each overhead value includes a symbol quantity or a slot quantity (the following uses the symbol quantity as an example for description).

As shown in FIG. 3A, it is assumed that an overhead value A3 corresponding to a symbol quantity being 1 is 6, an overhead value B3 corresponding to a symbol quantity being 3 is 9, an overhead value C3 corresponding to a symbol quantity being 5 is 12, an overhead value D3 corresponding to a symbol quantity being 7 is 18, and an overhead value E3 corresponding to a symbol quantity being 14 is 24.

Figure 3B:
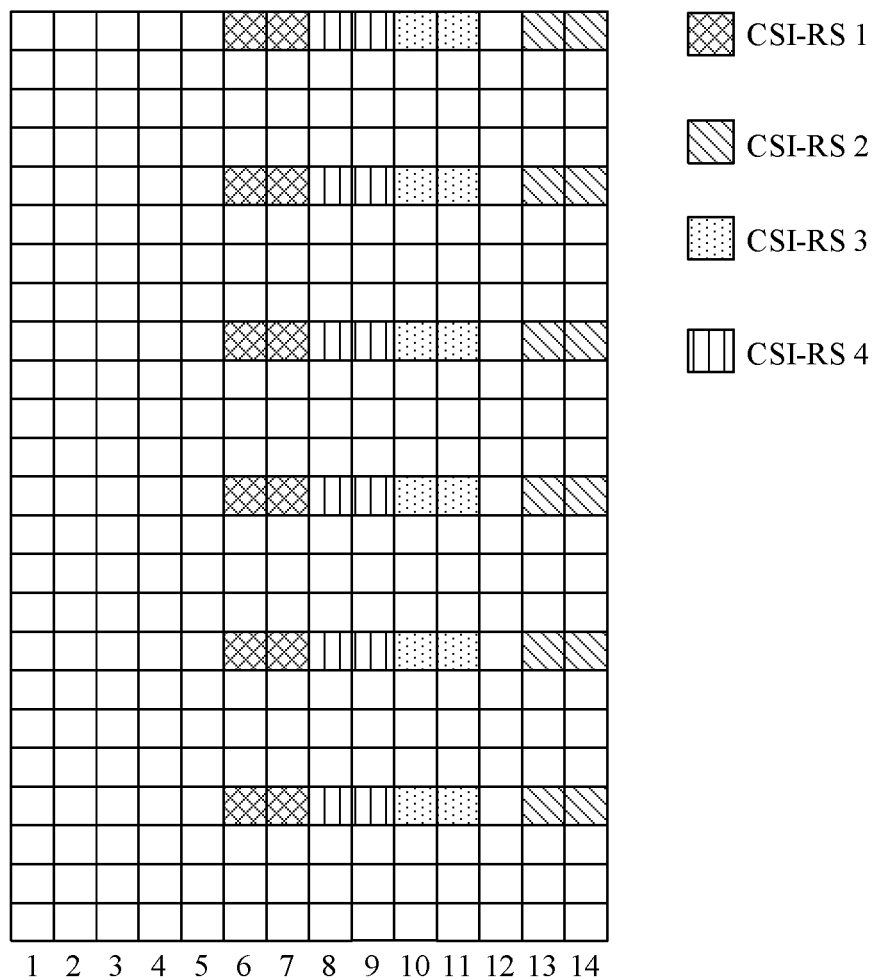
FIG. 3B is a schematic structural diagram 2 of a time-frequency resource according to an embodiment of this application.

Alternatively, as shown in FIG. 3B, it is assumed that an overhead value A4 corresponding to a symbol quantity being 1 and a symbol quantity being 2 is 6, an overhead value B4 corresponding to a symbol quantity being 3 to a symbol quantity being 5 is 9, an overhead value C4 corresponding to a symbol quantity being 6 to a symbol quantity being 8 is 12, an overhead value D4 corresponding to a symbol quantity being 9 to a symbol quantity being 12 is 18, and an overhead value E4 corresponding to a symbol quantity being 13 and a symbol quantity being 14 is 24.

It should be noted that FIG. 3B is only an example, and a location of a pilot signal (for example, a CSI-RS 1 to a CSI-RS 4) and a quantity of REs occupied by the pilot signal are not limited.

In one embodiment, the at least two overhead values (for example, the overhead value A4 to the overhead value E4) in operation S201 may be obtained based on one or more pieces of overhead value information indicated by using signaling or one or more pieces of stored overhead value information. Specifically, at least one of the following three implementations may be used.

In a first implementation, the one or more pieces of overhead value information may include the at least two overhead values or overhead value identifiers corresponding to the at least two overhead values. In a second implementation, the one or more pieces of overhead value information may include the at least two overhead values and information about at least one time-frequency resource unit corresponding to each overhead value, for example, as shown in Table 8 (an example in which information about a time-frequency resource unit includes a symbol quantity is used). In a third implementation, the one or more pieces of overhead value information may include an overhead value identifier corresponding to each of the at least two overhead values and information about at least one time-frequency resource unit corresponding to each overhead value identifier.

TABLE 8 schematic table 8 of a form of overhead value information

| Symbol quantity | Overhead value |
| --- | --- |
| 1-2 | A4 (for example, 6) |
| 3-5 | B4 (for example, 9) |
| 6-8 | C4 (for example, 12) |
| 9-12 | D4 (for example, 18) |
| 13-14 | E4 (for example, 24) |

Correspondingly, assuming that a target time-frequency resource includes that the symbol quantity is 2, the target overhead value is A4 (6). Alternatively, assuming that the target time-frequency resource includes that the symbol quantity is 4, the target overhead value is B4 (9). Alternatively, assuming that the target time-frequency resource includes that the symbol quantity is 10, the target overhead value is D4 (18). It can be learned that the target overhead value may be at least one of a plurality of overhead values.

For example, assuming that a time-frequency resource unit set is a symbol quantity set, an identifier of a symbol quantity is an identifier (or an index) of the symbol quantity in the symbol quantity set. For example, the symbol quantity set is at least one of {1-2, 3-5, 6-8, 9-12, 13-14, . . . }, the identifier of the symbol quantity is as follows: an identifier 1 of a symbol quantity represents symbol quantities 1 and 2, an identifier 2 of a symbol quantity represents symbol quantities 3 to 5, an identifier 3 of a symbol quantity represents symbol quantities 6 to 8, an identifier 4 of a symbol quantity represents symbol quantities 9 to 12, and so on. It should be noted that the identifier (or the index) of the symbol quantity may also be numbered from 0. This is not specifically limited here. Correspondingly, Table 8 may be represented as the following Table 9:

TABLE 9 schematic table 9 of a form of overhead value information

| Identifier of a symbol quantity | Overhead value |
| --- | --- |
| 1 | 6 |
| 2 | 9 |
| 3 | 12 |
| 4 | 18 |
| 5 | 24 |

In conclusion, according to the method for determining a transport block size provided in this embodiment of this application, a corresponding target overhead value may be determined for each of different time domain resources. This is not only applicable to a scenario in which a dynamic time domain resource is scheduled, but also improves accuracy of determining the TBS. Therefore, transmission performance is improved.

Based on the foregoing embodiments, in Embodiment 3 of the method for determining a transport block size according to this application, an example in which information about a time-frequency resource unit includes at least one of an RB identifier, an identifier of an RB identifier, an RBG identifier, an identifier of an RBG identifier, a subband identifier, an identifier of a subband identifier, an RB quantity, an identifier of the RB quantity, an RBG quantity, an identifier of the RBG quantity, a subband quantity, and an identifier of the subband quantity (in frequency domain) is used to explain and describe the foregoing operation S201.

This embodiment of this application may be an independent embodiment, or may be combined with another embodiment of this application. Specifically, this is not limited herein.

In one embodiment, an RB in this embodiment of this application is a resource element block, and may be a minimum scheduling unit in frequency domain.

In one embodiment, an RBG in this embodiment of this application is a resource element block group, and one RBG may include one or more RBs.

In one embodiment, a subband (subband) in this embodiment of this application includes one or more RBs, or may include one or more RBGs.

In one embodiment, the subband may be a plurality of consecutive RBs, or may be a plurality of inconsecutive RBs, or may be a plurality of consecutive RBGs, or may be a plurality of inconsecutive RBGs.

In this embodiment, the at least two overhead values in operation S201 may be obtained based on one or more pieces of overhead value information indicated by using signaling and/or one or more pieces of stored overhead value information. Specifically, at least one of the following three implementations may be used.

In a first implementation, the one or more pieces of overhead value information may include the at least two overhead values or overhead value identifiers corresponding to the at least two overhead values. In a second implementation, the one or more pieces of overhead value information may include the at least two overhead values and information about at least one time-frequency resource unit corresponding to each overhead value. In a third implementation, the one or more pieces of overhead value information may include an overhead value identifier corresponding to each of the at least two overhead values and information about at least one time-frequency resource unit corresponding to each overhead value identifier.

Figure 4A:
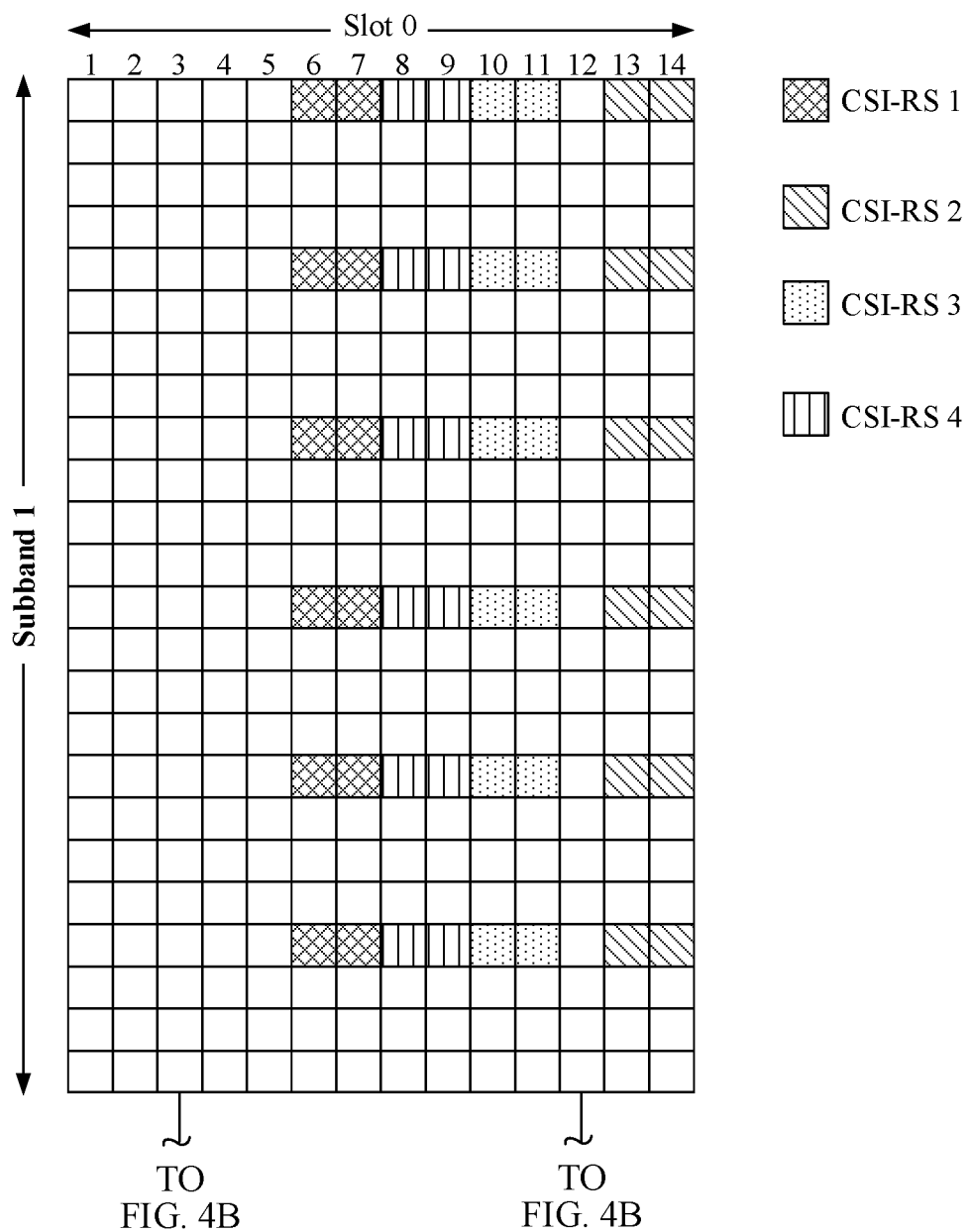
FIG. 4A and FIG. 4B are a schematic structural diagram 3 of a time-frequency resource according to an embodiment of this application.
Figure 4B:
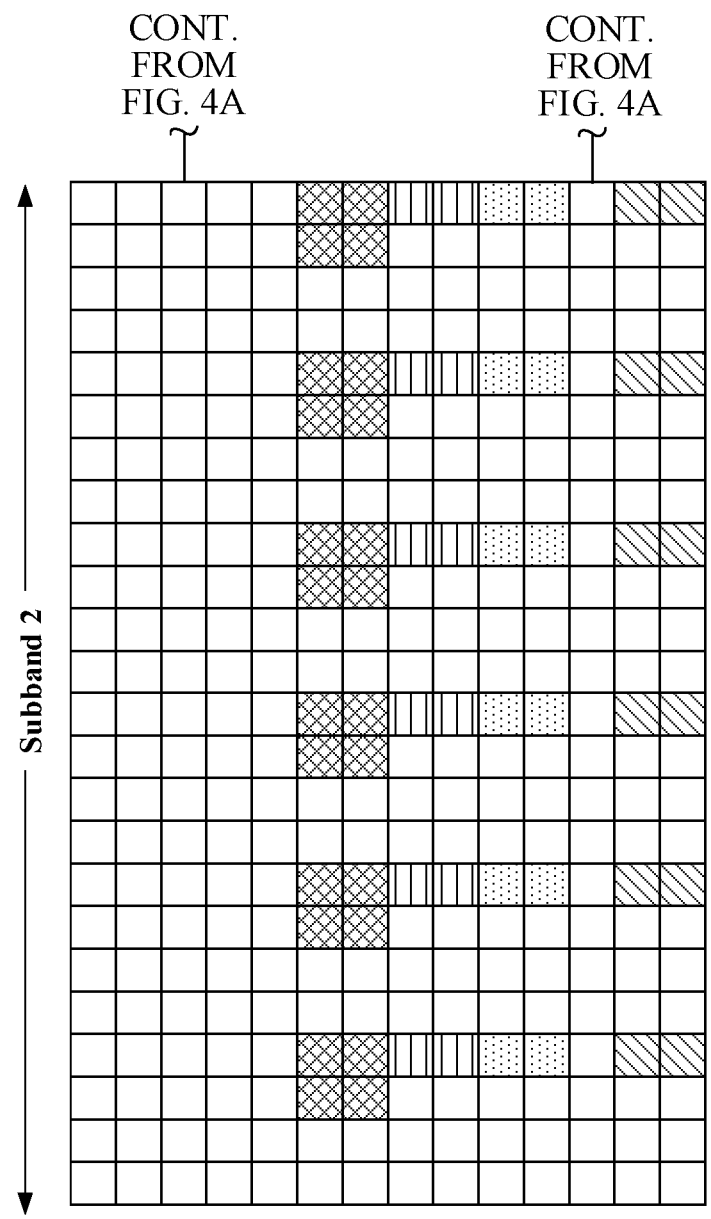

For example, if the information about the time-frequency resource unit corresponding to each overhead value includes at least one of an RB identifier, an RBG identifier, and a subband identifier (for ease of understanding, the following uses the subband identifier as an example for description). As shown in FIG. 4A and FIG. 4B, it is assumed that an overhead value A5 corresponding to a subband 1 is 6, and an overhead value B5 corresponding to a subband 2 is 12, where each of 1 and 2 represents a subband identifier. It should be noted that an example in which the subband identifier is numbered from 1 is used for description in this embodiment. Certainly, the subband identifier may also be numbered from 0, or may be numbered from another value. This is not limited in this embodiment of this application.

It should be noted that FIG. 4A and FIG. 4B are only an example, and a location of a pilot signal (for example, a CSI-RS 1 to a CSI-RS 4) and a quantity of REs occupied by the pilot signal are not limited.

The foregoing second implementation is used as an example. The one or more pieces of overhead value information may include the at least two overhead values (for example, the overhead value A5 and the overhead value B5) and the information about the at least one time-frequency resource unit corresponding to each overhead value, for example, as shown in Table 10 (an example in which information about a time-frequency resource unit includes a subband identifier is used). It should be noted that if an example in which the information about the time-frequency resource unit includes an identifier of the subband identifier is used, Table 10 may be represented as a schematic table in another form. For details, refer to Table 5. Details are not described herein again.

TABLE 10 schematic table 10 of a form of overhead value information

| Subband identifier | Overhead value |
|---|---|
| 1 | A5 (for example, 6) |
| 2 | B5 (for example, 12) |

Correspondingly, assuming that a target time-frequency resource includes the subband 1 (namely, a subband identifier 1), a target overhead value is A5 (6). Alternatively, assuming that the target time-frequency resource includes the subband 2 (namely, a subband identifier 2), the target overhead value is B5 (12). It can be learned that the target overhead value may be at least one of a plurality of overhead values.

It should be noted that Embodiment 3 (that is implemented in frequency domain) of this application may be combined with Embodiment 2 (that is implemented in time domain) or any other embodiments of this application, and correspondingly, each subband identifier may also be corresponding to a plurality of overhead values.

For example, if the information about the time-frequency resource unit corresponding to each overhead value includes the subband identifier in frequency domain and a symbol identifier in time domain. As shown in FIG. 4A and FIG. 4B, it is assumed that an overhead value A6 corresponding to a first symbol (for example, a symbol identifier is 1) to a third symbol (for example, a symbol identifier is 3) on the subband 1 (for example, the subband identifier is 1) is 0, an overhead value B6 corresponding to a sixth symbol and a seventh symbol on the subband 1 is 6, an overhead value C6 corresponding to an eighth symbol and a ninth symbol on the subband 1 is 6, an overhead value D6 corresponding to a tenth symbol and an eleventh symbol on the subband 1 is 6, and an overhead value E6 corresponding to a thirteenth symbol and a fourteenth symbol on the subband 1 is 6. Alternatively, it is assumed that an overhead value A7 corresponding to a first symbol to a third symbol on the subband 2 is 0, an overhead value B7 corresponding to a sixth symbol and a seventh symbol on the subband 2 is 12, an overhead value C7 corresponding to an eighth symbol and a ninth symbol on the subband 2 is 6, an overhead value D7 corresponding to a tenth symbol and an eleventh symbol on the subband 2 is 6, and an overhead value E7 corresponding to a thirteenth symbol and the fourteenth symbol on the subband 2 is 6.

It should be noted that the example in which the subband identifier is numbered from 1 is used for description in this embodiment. Certainly, the subband identifier may also be numbered from 0, or may be numbered from another value. This is not limited in this embodiment of this application. In addition, an example in which the symbol identifier is numbered from 1 is used for description in this embodiment. Certainly, the symbol identifier may also be numbered from 0, or may be numbered from another value. This is not limited in this embodiment of this application.

For example, the one or more pieces of overhead value information may include the at least two overhead values and the information about the at least one time-frequency resource unit corresponding to each overhead value, for example, as shown in Table 11 (an example in which the information about the time-frequency resource unit includes the subband identifier and the symbol identifier is used).

TABLE 11 schematic table 11 of a form of overhead value information

| Subband identifier | Overhead value corresponding to symbol identifiers 1 to 3 | Overhead value corresponding to symbol identifiers 6 and 7 | Overhead value corresponding to symbol identifiers 8 and 9 | Overhead value corresponding to symbol identifiers 10 and 11 | Overhead value corresponding to symbol identifiers 13 and 14 |
|---|---|---|---|---|---|
| 1 | A6 (for example, 0) | B6 (for example, 6) | C6 (for example, 6) | D (for example, 6) | E6 (for example, 6) |
| 2 | A7 (for example, 0) | B7 (for example, 12) | C7 (for example, 6) | D7 (for example, 6) | E7 (for example, 6) |

Correspondingly, assuming that the target time-frequency resource includes the subband 1 (namely, the subband identifier 1) in frequency domain and the sixth symbol and the seventh symbol (in other words, symbol identifiers are respectively 6 and 7) in time domain, the target overhead value is B6 (6). Alternatively, assuming that the target time-frequency resource includes the subband 2 in frequency domain and the sixth symbol to the ninth symbol in time domain, the target overhead value is a sum (18) of the overhead value B7 (12) corresponding to the sixth symbol and the seventh symbol on the subband 2 and the overhead value C7 (6) corresponding to the eighth symbol and the ninth symbol on the subband 2. It can be learned that the target overhead value may be obtained after a predetermined operation (for example, an addition operation) is performed on at least one of a plurality of overhead values.

For example, if the information about the time-frequency resource unit corresponding to each overhead value includes the subband identifier in frequency domain and the symbol identifier in time domain. As shown in FIG. 4A and FIG. 4B, it is assumed that an overhead value A8 corresponding to the first symbol (for example, the symbol identifier is 1) to the third symbol (for example, the symbol identifier is 3) on the subband 1 (for example, the subband identifier is 1) is 0, an overhead value B8 corresponding to the first symbol to the seventh symbol on the subband 1 is 6, an overhead value C8 corresponding to the first symbol to the ninth symbol on the subband 1 is 12, an overhead value D8 corresponding to the first symbol to the eleventh symbol on the subband 1 is 18, and an overhead value E8 corresponding to the first symbol to the fourteenth symbol on the subband 1 is 24. Alternatively, it is assumed that an overhead value A9 corresponding to the first symbol to the third symbol on the subband 2 is 0, an overhead value B9 corresponding to the first symbol to the seventh symbol on the subband 2 is 12, an overhead value C9 corresponding to the first symbol to the ninth symbol on the subband 2 is 18, an overhead value D9 corresponding to the first symbol to the fourteenth symbol on the subband 2 is 24, and an overhead value E9 corresponding to the first symbol to the fourteenth symbol on the subband 2 is 30.

For example, the one or more pieces of overhead value information may include the at least two overhead values and the information about the at least one time-frequency resource unit corresponding to each overhead value, for example, as shown in Table 12 (the example in which the information about the time-frequency resource unit includes the subband identifier and the symbol identifier is used).

TABLE 12 schematic table 12 of a form of overhead value information

| Subband identifier | Overhead value corresponding to symbol identifiers 1 to 3 | Overhead value corresponding to symbol identifiers 1 to 7 | Overhead value corresponding to symbol identifiers 1 to 9 | Overhead value corresponding to symbol identifiers 1 to 11 | Overhead value corresponding to symbol identifiers 1 to 14 |
|---|---|---|---|---|---|
| 1 | A8 (for example, 0) | B8 (for example, 6) | C8 (for example, 12) | D8 (for example, 18) | E8 (for example, 24) |
| 2 | A9 (for example, 0) | B9 (for example, 12) | C9 (for example, 18) | D9 (for example, 24) | E9 (for example, 30) |

Correspondingly, assuming that the target time-frequency resource includes the subband 1 in frequency domain and a fourth symbol to the seventh symbol in time domain, the target overhead value is a difference between the overhead value B8 (6) corresponding to the first symbol to the seventh symbol on the subband 1 and the overhead value A8 (0) corresponding to the first symbol to the third symbol on the subband 1. Alternatively, assuming that the target time-frequency resource includes the subband 2 in frequency domain and the eighth symbol and the ninth symbol in time domain, the target overhead value is a difference between the overhead value C9 (18) corresponding to the first symbol to the ninth symbol on the subband 2 and the overhead value B9 (12) corresponding to the first symbol to the seventh symbol on the subband 2. It can be learned that the target overhead value may be obtained after a predetermined operation (for example, a subtraction operation) is performed on at least one of a plurality of overhead values.

Certainly, when the information about the time-frequency resource unit in Embodiment 3 of this application includes other information, for a specific combination manner of Embodiment 3 of this application and Embodiment 2 of this application, refer to the foregoing content related to "a combination of the subband identifier and the symbol identifier". Details are not described in this embodiment of this application.

In conclusion, according to the method for determining a transport block size provided in this embodiment of this application, a corresponding target overhead value may be determined for each of different frequency domain resources or each of different time-frequency resources. This is not only applicable to a scenario in which a dynamic frequency domain resource or a dynamic time-frequency resource is scheduled, but also improves accuracy of determining the TBS. Therefore, transmission performance is improved.

Based on the foregoing embodiments, in Embodiment 4 of the method for determining a transport block size according to this application, an example in which information about a time-frequency resource unit includes a slot identifier and/or an identifier of the slot identifier (in time domain) in a slot aggregation scenario is used to explain and describe the foregoing operation S201.

This scheme is applicable to a slot-based scheduling scenario and/or a non-slot based scheduling scenario. This is not specifically limited.

This embodiment of this application may be an independent embodiment, or may be combined with another embodiment of this application. Specifically, this is not limited herein.

In this embodiment, the at least two overhead values in operation S201 may be obtained based on one or more pieces of overhead value information indicated by using signaling and/or one or more pieces of stored overhead value information. Specifically, at least one of the following implementations may be used.

In a first implementation, the one or more pieces of overhead value information may include the at least two overhead values or overhead value identifiers corresponding to the at least two overhead values. In a second implementation, the one or more pieces of overhead value information may include the at least two overhead values and information about at least one time-frequency resource unit corresponding to each overhead value. In a third implementation, the one or more pieces of overhead value information may include an overhead value identifier corresponding to each of the at least two overhead values and information about at least one time-frequency resource unit corresponding to each overhead value identifier.

Figure 5:
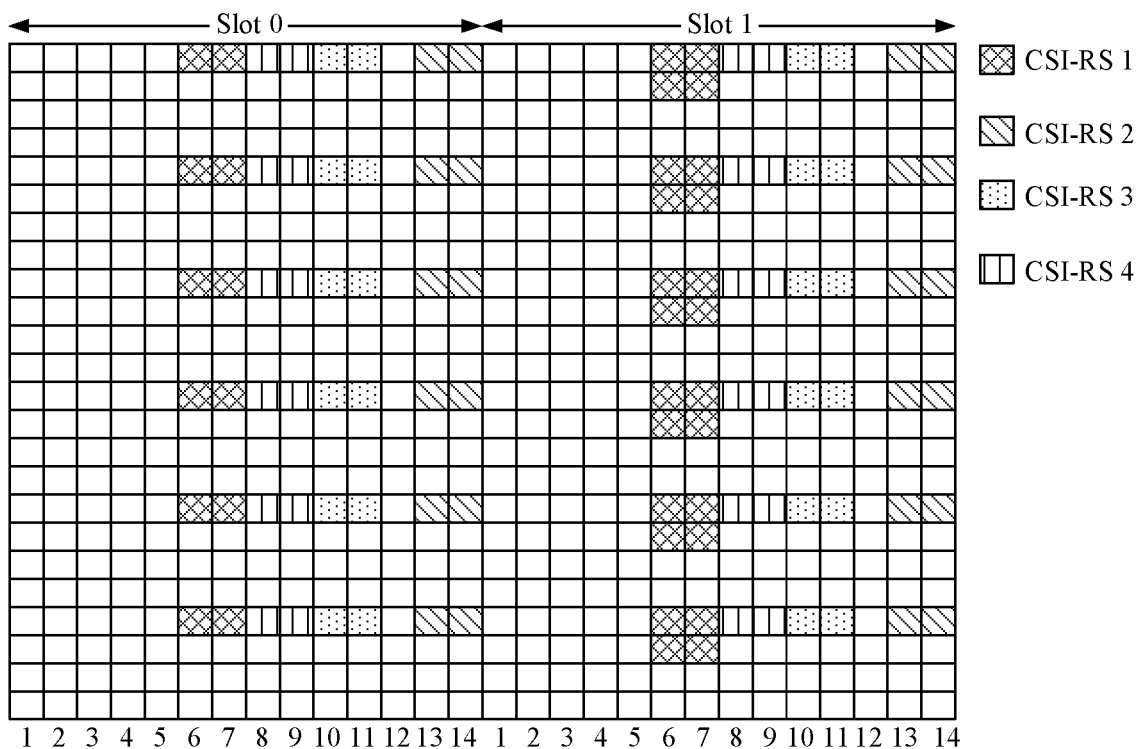
FIG. 5 is a schematic structural diagram 4 of a time-frequency resource according to an embodiment of this application.

For example, if information about a time domain resource unit corresponding to each overhead value includes a slot identifier, or a slot period and an offset (for ease of understanding, the following uses the slot identifier as an example for description). As shown in FIG. 5, it is assumed that an overhead value A10 corresponding to a slot 0 is 6, and an overhead value B10 corresponding to a slot 1 is 12, where each of 0 and 1 represents a slot identifier. It should be noted that an example in which the slot identifier is numbered from 0 is used for description in this embodiment. Certainly, the slot identifier may also be numbered from 1, or may be numbered from another value. This is not limited in this embodiment of this application.

It should be noted that FIG. 5 is only an example, and a location of a pilot signal (for example, a CSI-RS 1 to a CSI-RS 4) and a quantity of REs occupied by the pilot signal are not limited.

The foregoing second implementation is used as an example. The one or more pieces of overhead value information may include the at least two overhead values and the information about the at least one time-frequency resource unit corresponding to each overhead value, for example, as shown in Table 13 (an example in which information about a time-frequency resource unit is a slot identifier is used).

TABLE 13

| schematic table 13 of a form of overhead value information | |
|---|---|
| Slot identifier | Overhead value |
| 0 | A10 (for example, 6) |
| 1 | B10 (for example, 12) |

Correspondingly, assuming that a target time-frequency resource includes the slot 0 (namely, a slot identifier 0), a target overhead value is A10 (6). Alternatively, assuming that the target time-frequency resource includes the slot 1 (namely, a slot identifier 2), the target overhead value is B10 (12). It can be learned that the target overhead value may be at least one of a plurality of overhead values.

It should be noted that Embodiment 4 of this application may be combined with Embodiment 2 and/or Embodiment 3 (that is implemented in frequency domain) or any other embodiments of this application, and correspondingly, each slot identifier may also be corresponding to a plurality of overhead values. For ease of understanding, the following uses an example in which Embodiment 4 of this application is combined with Embodiment 2 of this application as an example for description.

For example, if the information about the time-frequency resource unit corresponding to each overhead value includes the slot identifier and a symbol identifier. As shown in FIG. 5, it is assumed that an overhead value A11 corresponding to a first symbol (for example, a symbol identifier is 1) to a third symbol in the slot 0 (for example, the symbol identifier is 0) is 0, an overhead value B11 corresponding to a sixth symbol and a seventh symbol in the slot 0 is 6, an overhead value C11 corresponding to an eighth symbol and a ninth symbol in the slot 0 is 6, an overhead value D11 corresponding to a tenth symbol and an eleventh symbol in the slot 0 is 6, and an overhead value E11 corresponding to a thirteenth symbol and a fourteenth symbol in the slot 0 is 6. Alternatively, it is assumed that an overhead value A12 corresponding to a first symbol to a third symbol in the slot 1 is 0, an overhead value B12 corresponding to a sixth symbol and a seventh symbol in the slot 1 is 12, an overhead value C12 corresponding to an eighth symbol and a ninth symbol in the slot 1 is 6, an overhead value D12 corresponding to a tenth symbol and an eleventh symbol in the slot 1 is 6, and an overhead value E12 corresponding to a thirteenth symbol and a fourteenth symbol in the slot 1 is 6.

It should be noted that an example in which the symbol identifier is numbered from 1 is used for description in this embodiment. Certainly, the symbol identifier may also be numbered from 0, or may be numbered from another value. This is not limited in this embodiment of this application.

For example, the one or more pieces of overhead value information may include the at least two overhead values and the information about the at least one time-frequency resource unit corresponding to each overhead value, for example, as shown in Table 14 (an example in which the information about the time-frequency resource unit includes the slot identifier and the symbol identifier is used).

TABLE 14 schematic table 14 of a form of overhead value information

| Slot identifier | Overhead value corresponding to symbol identifiers 1 to 3 | Overhead value corresponding to symbol identifiers 6 and 7 | Overhead value corresponding to symbol identifiers 8 and 9 | Overhead value corresponding to symbol identifiers 10 and 11 | Overhead value corresponding to symbol identifiers 13 and 14 |
|---|---|---|---|---|---|
| 0 | A11 (for example, 0) | B11 (for example, 6) | C11 (for example, 6) | D11 (for example, 6) | E11 (for example, 6) |
| 1 | A12 (for example, 0) | B12 (for example, 12) | C12 (for example, 6) | D12 (for example, 6) | E12 (for example, 6) |

Correspondingly, assuming that the target time-frequency resource includes the sixth symbol and the seventh symbol in the slot 0, the target overhead value is B11 (6). Alternatively, assuming that the target time-frequency resource includes the sixth symbol and the seventh symbol in the slot 1, the target overhead value is B12 (12). It can be learned that the target overhead value may be at least one of a plurality of overhead values.

For example, if the information about the time-frequency resource unit corresponding to each overhead value includes the slot identifier and the symbol identifier. As shown in FIG. 5, it is assumed that an overhead value A13 corresponding to the first symbol to the third symbol in the slot 0 is 0, an overhead value B13 corresponding to the first symbol to the seventh symbol in the slot 0 is 6, an overhead value C13 corresponding to the first symbol to the ninth symbol in the slot 0 is 12, an overhead value D13 corresponding to the first symbol to the eleventh symbol in the slot 0 is 18, and an overhead value E13 corresponding to the first symbol to the fourteenth symbol in the slot 0 is 24. Alternatively, it is assumed that an overhead value A14 corresponding to the first symbol to the third symbol in the slot 1 is 0, an overhead value B14 corresponding to the first symbol to the seventh symbol in the slot 1 is 12, an overhead value C14 corresponding to the first symbol to the ninth symbol in the slot 1 is 18, an overhead value D14 corresponding to the first symbol to the eleventh symbol in the slot 1 is 24, and an overhead value E14 corresponding to the first symbol to the fourteenth symbol in the slot 1 is 30.

For example, the one or more pieces of overhead value information may include the at least two overhead values and the information about the at least one time-frequency resource unit corresponding to each overhead value, for example, as shown in Table 15 (the example in which the information about the time-frequency resource unit includes the slot identifier and the symbol identifier is used).

Correspondingly, assuming that the target time-frequency resource includes a fourth symbol to the seventh symbol in the slot 0, the target overhead value is a difference between the overhead value B13 (6) corresponding to the first symbol to the seventh symbol in the slot 0 and the overhead value A13 (0) corresponding to the first symbol to the third symbol in the slot 0. Alternatively, assuming that the target time-frequency resource includes the fourth symbol to the seventh symbol in the slot 1, the target overhead value is a difference between the overhead value B14 (12) corresponding to the first symbol to the seventh symbol in the slot 1 and the overhead value A14 (0) corresponding to the first symbol to the third symbol in the slot 1. It can be learned that the target overhead value may be obtained after a predetermined operation (for example, a subtraction operation) is performed on at least one of a plurality of overhead values.

Certainly, when the information about the time-frequency resource unit in Embodiment 4 of this application includes other information, for a specific combination manner of Embodiment 4 of this application and Embodiment 2 of this application, refer to the foregoing content related to "a combination of the slot identifier and the symbol identifier". Details are not described in this embodiment of this application.

Certainly, Embodiment 4 of this application may further be combined with Embodiment 3 of this application, or Embodiment 4 of this application may be combined with both Embodiment 2 and Embodiment 3 of this application, or any other embodiments. For a specific combination manner, may refer to content related to "a combination of Embodiment 4 of this application and Embodiment 2 of this application". Details are not described in this embodiment of this application.

In conclusion, according to the method for determining a transport block size provided in this embodiment of this application, a corresponding target overhead value may be determined for each of different time domain resources or

TABLE 15 schematic table 15 of a form of overhead value information

| Slot identifier | Overhead value corresponding to symbol identifiers 1 to 3 | Overhead value corresponding to symbol identifiers 1 to 7 | Overhead value corresponding to symbol identifiers 1 to 9 | Overhead value corresponding to symbol identifiers 1 to 11 | Overhead value corresponding to symbol identifiers 1 to 14 |
|---|---|---|---|---|---|
| 0 | A13 (for example, 0) | B13 (for example, 6) | C13 (for example, 12) | D13 (for example, 18) | E13 (for example, 24) |
| 1 | A14 (for example, 0) | B14 (for example, 12) | C14 (for example, 18) | D14 (for example, 24) | E14 (for example, 30) | each of different time-frequency resources. This is not only applicable to a scenario in which a dynamic time domain resource or a dynamic time-frequency resource is scheduled, but also improves accuracy of determining the TBS. Therefore, transmission performance is improved.

Figure 6:
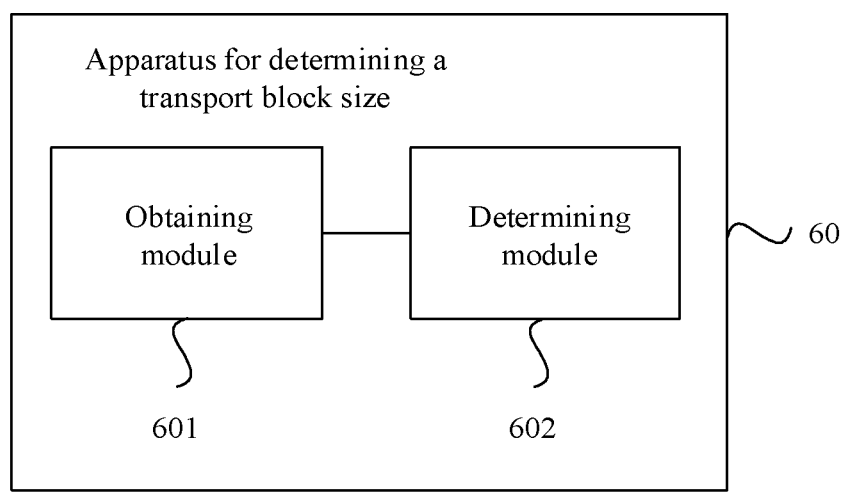
FIG. 6 is a schematic structural schematic of Embodiment 1 of an apparatus for determining a transport block size according to this application.

FIG. 6 is a schematic structural schematic of Embodiment 1 of an apparatus for determining a transport block size according to this application. As shown in FIG. 6, an apparatus 60 for determining a transport block size according to this embodiment may include an obtaining module 601 and a determining module 602.

The obtaining module 601, configured to obtain a target overhead value based on a target time-frequency resource and one or more of at least two overhead values, where the target time-frequency resource is used for uplink data transmission or downlink data transmission and includes one or more time-frequency resource units, and each overhead value is corresponding to at least one time-frequency resource unit.

The determining module 602, configured to determine a transport block size based on the target overhead value.

In one embodiment, the overhead value is obtained from one or more pieces of overhead value information indicated by using signaling, and/or the overhead value is obtained from one or more pieces of stored overhead value information.

In one embodiment, the overhead value information includes at least one overhead value, or at least one overhead value identifier.

In one embodiment, the overhead value information further includes information about the at least one time-frequency resource unit corresponding to the overhead value, or the overhead value information further includes information about at least one time-frequency resource unit corresponding to the overhead value identifier.

In one embodiment, the time-frequency resource unit includes at least one of the following: a symbol, a slot, a resource block, a resource block group, and/or a subband.

In one embodiment, the information about the time-frequency resource unit includes at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block identifier, an identifier of the resource block identifier, a resource block group identifier, an identifier of the resource block group identifier, a subband identifier, an identifier of the subband identifier, a resource block quantity, an identifier of the resource block quantity, a resource block group quantity, an identifier of the resource block group quantity, a subband quantity, and/or an identifier of the subband quantity.

In one embodiment, the obtaining module 601 includes:
a first obtaining unit, configured to obtain the one or more time-frequency resource units in the target time-frequency resource; and
a second obtaining unit, configured to obtain the target overhead value based on one or more overhead values corresponding to the one or more time-frequency resource units.

In one embodiment, the target overhead value is at least one of a plurality of overhead values; and/or
the target overhead value is obtained after a predetermined operation is performed on at least one of a plurality of overhead values.

In one embodiment, the determining module 602 includes:
a first determining unit, configured to determine reference resource element information based on the target overhead value, where the reference resource element information is a value of a quantity of reference resource elements that is used to calculate the transport block size; and
a second determining unit, configured to determine the transport block size based on the reference resource element information, resource block information, a modulation scheme, and a bit rate, where the resource block information is determined based on the target time-frequency resource.

The apparatus for determining a transport block size in this embodiment may be configured to perform the technical solutions of the foregoing embodiments of the method for determining a transport block size in this application. Implementation principles and technical effects of the apparatus are similar, and details are not described herein again.

Figure 7:
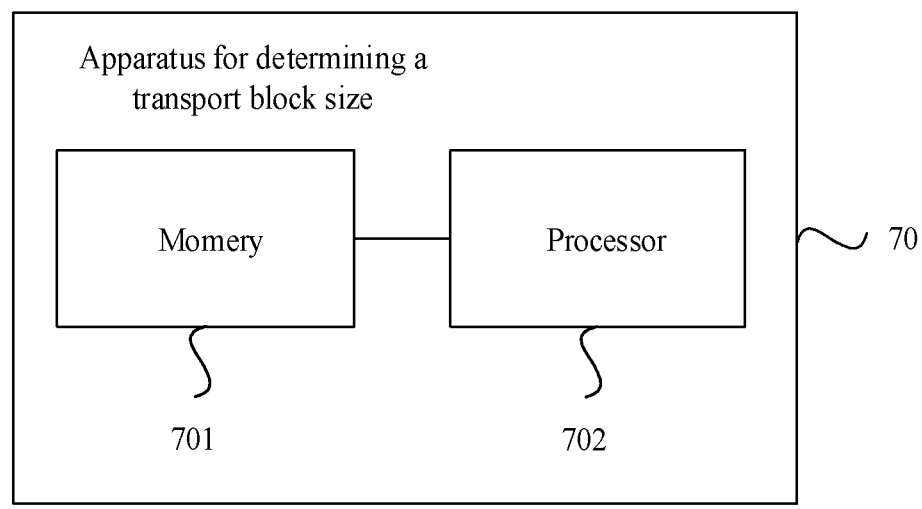
FIG. 7 is a schematic structural schematic of Embodiment 2 of an apparatus for determining a transport block size according to this application.

FIG. 7 is a schematic structural schematic of Embodiment 2 of an apparatus for determining a transport block size according to this application. As shown in FIG. 7, an apparatus 70 for determining a transport block size according to this embodiment may include a memory 701 and a processor 702.

The memory 701 is configured to store a program instruction.

The processor 702 is configured to invoke the program instruction in the memory to perform the following operations:
obtaining a target overhead value based on a target time-frequency resource and one or more of at least two overhead values, where the target time-frequency resource is used for uplink data transmission or downlink data transmission and includes one or more time-frequency resource units, and each overhead value is corresponding to at least one time-frequency resource unit; and
determining a transport block size based on the target overhead value.

In one embodiment, the overhead value is obtained from one or more pieces of overhead value information indicated by using signaling, and/or the overhead value is obtained from one or more pieces of stored overhead value information.

In one embodiment, the overhead value information includes at least one overhead value, or at least one overhead value identifier.

In one embodiment, the overhead value information further includes information about the at least one time-frequency resource unit corresponding to the overhead value, or the overhead value information further includes information about at least one time-frequency resource unit corresponding to the overhead value identifier.

In one embodiment, the time-frequency resource unit includes at least one of the following: a symbol, a slot, a resource block, a resource block group, and/or a subband.

In one embodiment, the information about the time-frequency resource unit includes at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block identifier, an identifier of the resource block identifier, a resource block group identifier, an identifier of the resource block group identifier, a subband identifier, an identifier of the subband identifier, a resource block quantity, an identifier of the resource block quantity, a resource block group quantity, an identifier of the resource block group quantity, a subband quantity, and/or an identifier of the subband quantity.

In one embodiment, the processor 702 is specifically configured to:

obtain the one or more time-frequency resource units in the target time-frequency resource; and obtain the target overhead value based on one or more overhead values corresponding to the one or more time-frequency resource units.

In one embodiment, the target overhead value is at least one of a plurality of overhead values; and/or the target overhead value is obtained after a predetermined operation is performed on at least one of a plurality of overhead values.

In one embodiment, the processor 702 is specifically configured to:

determine reference resource element information based on the target overhead value, where the reference resource element information is a value of a quantity of reference resource elements that is used to calculate the transport block size; and determine the transport block size based on the reference resource element information, resource block information, a modulation scheme, and a bit rate, where the resource block information is determined based on the target time-frequency resource.

The apparatus for determining a transport block size in this embodiment may be configured to perform the technical solutions of the foregoing embodiments of the method for determining a transport block size in this application. Implementation principles and technical effects of the apparatus are similar, and details are not described herein again.

It may be understood that FIG. 7 shows merely a simplified design of the apparatus for determining a transport block size. In another implementation, the apparatus for determining a transport block size may further include any quantity of transmitters, receivers, processors, memories, and/or communications units. This is not limited in this embodiment of this application.

In the several embodiments provided in this application, it should be understood that the disclosed apparatus and method may be implemented in another manner. For example, the foregoing apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of hardware in addition to a software function unit.

A person of ordinary skill in the art may understand that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

All or some of the foregoing embodiments may be implemented by software, hardware, firmware, or any combination thereof. When software is used to implement the embodiments, some or all of the embodiments may be implemented in a form of a computer program product. The computer program product includes one or more computer instructions. When the computer program instructions are loaded and executed on a computer, some or all of the procedures or functions according to the embodiments of this application are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive or Solid State Disk (SSD)), or the like.

What is claimed is:

1. A method for determining a transport block size, comprising:

obtaining a target overhead value based on a target time-frequency resource and at least two overhead values, wherein the target time-frequency resource is used for uplink data transmission or downlink data transmission, and comprises one or more time-frequency resource units, and each of the at least two overhead values corresponds to at least one time-frequency resource unit; and determining a transport block size based on the target overhead value.

2. The method according to claim 1, wherein the target overhead value is obtained from one or more pieces of overhead value information indicated by using signaling, and/or the target overhead value is obtained from one or more pieces of stored overhead value information.

3. The method according to claim 2, wherein the overhead value information comprises at least one of the overhead values, or at least one overhead value identifier.

4. The method according to claim 3, wherein the overhead value information further comprises information about the at least one time-frequency resource unit corresponding to the overhead value, or the overhead value information further comprises information about at least one time-frequency resource unit corresponding to the overhead value identifier.

5. The method according to claim 4, wherein the time-frequency resource unit comprises at least one of the following: a symbol, a slot, a resource block, a resource block group, or a subband.

6. The method according to claim 5, wherein the information about the time-frequency resource unit comprises at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block identifier, an identifier of the resource block identifier, a resource block group identifier, an identifier of the resource block group identifier, a subband identifier, an identifier of the subband identifier, a resource block quantity, an identifier of the resource block quantity, a resource block group quantity, an identifier of the resource block group quantity, a subband quantity, or an identifier of the subband quantity.

7. The method according to claim 1, wherein the obtaining the target overhead value based on a target time-frequency resource and at least two overhead values comprises:
obtaining the one or more time-frequency resource units in the target time-frequency resource; and
obtaining the target overhead value based on one or more overhead values corresponding to the one or more time-frequency resource units.

8. The method according to claim 1, wherein the target overhead value is at least one of a plurality of overhead values; and
the target overhead value is obtained after a predetermined operation is performed on at least one of the plurality of overhead values.

9. The method according to claim 1, wherein the determining a transport block size based on the target overhead value comprises:
determining reference resource element information based on the target overhead value, wherein the reference resource element information is a value of a quantity of reference resource elements that is used to calculate the transport block size; and
determining the transport block size based on the reference resource element information, resource block information, a modulation scheme, and a bit rate, wherein the resource block information is determined based on the target time-frequency resource.

10. An apparatus for determining a transport block size, comprising:
one or more processor configured to;
obtain a target overhead value based on a target time-frequency resource and at least two overhead values, wherein the target time-frequency resource is used for uplink data transmission or downlink data transmission, and comprises one or more time-frequency resource units, and each of the at least two overhead values corresponds to at least one time-frequency resource unit; and
determine a transport block size based on the target overhead value.

11. The apparatus according to claim 10, wherein the target overhead value is obtained from one or more pieces of overhead value information indicated by using signaling, and/or the target overhead value is obtained from one or more pieces of stored overhead value information.

12. The apparatus according to claim 11, wherein the overhead value information comprises at least one of the overhead values, or at least one overhead value identifier.

13. The apparatus according to claim 12, wherein the overhead value information further comprises information about the at least one time-frequency resource unit corresponding to the overhead value, or the overhead value information further comprises information about at least one time-frequency resource unit corresponding to the overhead value identifier.

14. The apparatus according to claim 13, wherein the time-frequency resource unit comprises at least one of the following: a symbol, a slot, a resource block, a resource block group, or a subband.

15. The apparatus according to claim 14, wherein the information about the time-frequency resource unit comprises at least one of the following: a symbol identifier, an identifier of the symbol identifier, a symbol quantity, an identifier of the symbol quantity, a slot identifier, an identifier of the slot identifier, a slot quantity, an identifier of the slot quantity, a resource block identifier, an identifier of the resource block identifier, a resource block group identifier, an identifier of the resource block group identifier, a subband identifier, an identifier of the subband identifier, a resource block quantity, an identifier of the resource block quantity, a resource block group quantity, an identifier of the resource block group quantity, a subband quantity, or an identifier of the subband quantity.

16. The apparatus according to claim 10, wherein the one or more processors are further configured to:
obtain the one or more time-frequency resource units in the target time-frequency resource; and
obtain the target overhead value based on one or more overhead values corresponding to the one or more time-frequency resource units.

17. The apparatus according to claim 10, wherein the target overhead value is at least one of a plurality of overhead values; and
the target overhead value is obtained after a predetermined operation is performed on at least one of the plurality of overhead values.

18. The apparatus according to claim 10, wherein the one or more processors are further configured to:
determine reference resource element information based on the target overhead value, wherein the reference resource element information is a value of a quantity of reference resource elements that is used to calculate the transport block size; and
determine the transport block size based on the reference resource element information, resource block information, a modulation scheme, and a bit rate, wherein the resource block information is determined based on the target time-frequency resource.

19. A non-transitory computer readable medium having instructions stored therein, which when executed by a processor, cause the processor to perform operations, the operations comprising:
obtaining a target overhead value based on a target time-frequency resource and at least two overhead values, wherein the target time-frequency resource is used for uplink data transmission or downlink data transmission, and comprises one or more time-frequency resource units, and each of the at least two overhead values corresponds to at least one time-frequency resource unit; and
determining a transport block size based on the target overhead value.

20. The non-transitory computer readable medium according to claim 19, wherein the target overhead value is obtained from one or more pieces of overhead value information indicated by using signaling, and/or the target overhead value is obtained from one or more pieces of stored overhead value information.

* * * * *